US006976136B2

(12) United States Patent
Falik et al.

(10) Patent No.: US 6,976,136 B2
(45) Date of Patent: Dec. 13, 2005

(54) FLASH MEMORY PROTECTION SCHEME FOR SECURED SHARED BIOS IMPLEMENTATION IN PERSONAL COMPUTERS WITH AN EMBEDDED CONTROLLER

(75) Inventors: Ohad Falik, Kfar Saba (IL); Michal Schramm, Tel Aviv (IL)

(73) Assignee: National Semiconductor Corporation, Santa Clara, CA (US)

( * ) Notice: Subject to any disclaimer, the term of this patent is extended or adjusted under 35 U.S.C. 154(b) by 689 days.

(21) Appl. No.: 09/850,543

(22) Filed: May 7, 2001

(65) Prior Publication Data

US 2002/0166061 A1    Nov. 7, 2002

(51) Int. Cl.[7] ............................................. G06F 12/14
(52) U.S. Cl. ................................................... 711/152
(58) Field of Search ........................ 711/103, 152, 163, 711/164

(56) References Cited

U.S. PATENT DOCUMENTS

| | | | | |
|---|---|---|---|---|
| 5,022,077 A | * | 6/1991 | Bealkowski et al. | 711/163 |
| 5,579,522 A | * | 11/1996 | Christeson et al. | 713/2 |
| 5,937,063 A | * | 8/1999 | Davis | 713/187 |
| 6,292,012 B1 | * | 9/2001 | Yeh et al. | 326/8 |
| 6,308,265 B1 | * | 10/2001 | Miller | 713/2 |
| 6,381,681 B1 | * | 4/2002 | McCracken et al. | 711/152 |
| 6,633,976 B1 | * | 10/2003 | Stevens | 713/2 |
| 6,651,188 B2 | * | 11/2003 | Harding et al. | 714/38 |
| 6,715,074 B1 | * | 3/2004 | Chaiken | 713/164 |
| 6,745,329 B1 | * | 6/2004 | Kao | 713/200 |
| 6,757,838 B1 | * | 6/2004 | Chaiken et al. | 714/5 |
| 6,775,750 B2 | * | 8/2004 | Krueger | 711/152 |

* cited by examiner

Primary Examiner—Kevin L. Ellis

(57) ABSTRACT

An apparatus and method are disclosed for protecting the contents of a shared memory in a memory device controlled by an embedded controller. The apparatus allows dynamic setting of access permissions to said contents and allows updating and recovery of the contents. A computerized system comprising at least one Host linked to the memory device provides access paths to the shared memory, to the Host, and to the embedded controller. An arbitration device for allocating access paths to the memory device is also provided. The memory device is partitioned into separate blocks, each of which is used to store different types of data. A location is designated in the shared memory for storing protection information that includes data related to access operations allowed by at least one access path to a part of the shared memory. Access, via the arbitration device, to separate parts of the shared memory is permitted by using an access control unit that enables/disables access to predetermined portions of the shared memory by at least one of the access paths.

46 Claims, 12 Drawing Sheets

PROTECTION WORD

| BIT | 10-15 | 7-9 | 6 | 5 | 4 | 3 | 2 | 1 | 0 |
|---|---|---|---|---|---|---|---|---|---|
| DESCR. | NOT RELEVANT | FLASH CONTENT PROTECT | NOT RELEVANT | | HOST BOOT BLOCK | | EC BOOT BLOCK | | |

SHARED MEMORY HOST ACCESS PROTECT REGISTER (SMHAP)

| BIT | 7 | 6 | 5 | 4 | 3 | 2 | 1 | 0 |
|---|---|---|---|---|---|---|---|---|
| DESCR. | HOST ACCESS PROTECTION INDEX | | | | INDEX WRITE | HOST LOCK PROTECTION | HOST WRITE PROTECTION | HOST READ PROTECTION |

| BIT | 7 | 6 | 5 | 4 | 3 | 2 | 1 | 0 |
|---|---|---|---|---|---|---|---|---|
| DESCR. | HSEMIE | HSEMW | HLOCK | HERES | HERES | HERRIEN | HWERR | HRERR |

SHARED MEMORY CORE CONTROL AND STATUS REGISTER (SMCCST)

| BIT | 7 | 6 | 5 | 4 | 3 | 2 | 1 | 0 |
|---|---|---|---|---|---|---|---|---|
| DESCR. | CSEM0-CSEM3 | | | | HSEM0-HSEM3 | | | |

SHARED MEMORY HOST SEMAPHORE REGISTER (SMHSEM)

FLASH MEMORY PROTECTION SCHEME FOR SECURED SHARED BIOS IMPLEMENTATION IN PERSONAL COMPUTERS WITH AN EMBEDDED CONTROLLER

FIELD OF THE INVENTION

The present invention relates to the field of data protection. More particularly, the invention relates to an apparatus and method for the protection of Basic Input and Output System (BIOS) data stored in flash memory devices.

BACKGROUND OF THE INVENTION

Non-volatile memory devices are commonly used in computer systems to store information of critical importance, such as the machine start-up operations and the regular operations of the system peripheral devices. The computer start-up procedure routines (bootstrap) and input/output (I/O) device management routines are stored on a non-volatile memory known as BIOS memory. The content of BIOS memory is rarely altered, and is essential for future use.

In the past, it was very common to store the BIOS code on a Read Only Memory (ROM) or Erasable Programmable ROM (EPROM) device. The ROM device content is fixed once (at the factory) and cannot be altered thereafter. The EPROM may be programmed and erased but only after being removed from the system. If there were changes to be made to the BIOS code, the ROM device had to be removed and replaced with a new one (or an updated one), containing the new code. To enable updates, bug fixes, and storage of critical changing parameters, a non-volatile memory device enabling reprogram was required.

The Electrically Erasable Programmable ROM (EEPROM) is another non-volatile device that can be erased and reprogrammed on the printed circuit board (PCB). The EEPROM is erasable and programmable at the byte level. Its disadvantage is that it is relatively expensive, slow to access and limited in terms of memory size. Flash Memory (FM) devices are another kind of Electrically Erasable Programmable memory. Flash memories are accessible for reading at the byte level, and also may be programmed at the byte level. Erasure, however, may be performed only to entire sections of the FM device. These sections are usually referred to as blocks.

The erasure of FM blocks is a process of changing each bit in the erased section to a value of "1". The writing or programming process includes changing the required bits in the written byte from a value of "1" to a value of "0". If data is to be written to a location in an FM device, it should go through an erase operation first. Some memories will allow rewrite into a specific location, as long as bits are only changed from a value of "1" to a value of "0." By applying the erase process to large sections of the FM device the cost of Flash Memory devices is reduced. FM devices are therefore more cost effective than EEPROM devices. FM devices differ in the size of their blocks. For a specific FM device, all blocks may be of equal size or varying sizes. FM devices have a protection mechanism used to prevent accidental writes. The protection mechanism is also intended to prevent malicious writes.

FM devices that are used for BIOS storage may be with blocks of equal size or of varying size. In most cases, one of the blocks is assigned as a boot-block. This block may be written or erased only in a unique operation mode, which may be accessed utilizing special controls in the hardware level. For example, a special control may comprise a write-enable pin, or the application of high voltage to one of the device's pins. Typically, systems are designed to disable such operation, and in most cases the removal of the device from the board is required or at least changing one of its jumpers to enable it. Furthermore, the boot-block usually holds enough information to allow programming of the FM device even when other parts of the flash are corrupted.

It should be noted that FM devices cannot replace Random Access Memory (RAM) devices in most cases. A RAM may be written in any order and as many times as required, while a flash memory requires erase operations and has only a limited number of erase-program cycles that it can tolerate before its reliability deteriorates. This number is referred to as FM endurance.

Protection of FM devices from erroneous writes is achieved by utilizing some or all of the following methods:

(1) The erase and program process requires a preamble procedure that rarely happens by accident.

(2) The device has a write enable input signal that may be tied to a Dip-Switch or a jumper so that write operations may be only manually enabled.

(3) Alternatively, programming the FM device may be controlled by a General Purpose I/O signal (GPIO) that will take a special sequence of operations to enable the write process.

All of the methods mentioned above provide reasonable protection against accidental writes. But, with the exception of the jumper/Dip-Switch option, they provide poor protection against malicious attacks that utilize knowledge of the system structure. Even the jumpers are vulnerable to attacks that alter the update information without the user's knowledge. These methods also have the disadvantage that they require opening the box by a skilled person. Jumpers usage also prevents the use of the FM device for storage of information while the system operates. An example of information that one may desire to store in the flash is Plug and Play (PnP) information used to speed up the boot process.

To facilitate BIOS upgrades, many computer boards are shipped with enabled BIOS programming voltage. This leaves the BIOS vulnerable. Allowing critical BIOS code to be altered by software exposes it to the hazard of malicious virus attacks and erroneous changes. In fact, some computer viruses are designed to overwrite a section of the FM BIOS, leaving the computer unbootable until a new BIOS is installed, and even worse, cause damage to other parts such as the hard disk drive's contents. In case of attack, an operation by a skilled technician is required to initiate a special recovery process.

The Intel 82802AB/AC (FWH) Firmware Hub is an example of a FM memory device utilized to store and manage the computer system and graphic BIOS. In this device, two input pins are dedicated for hardware write and erase protection of the FM device blocks. One input pin provides protection to the device's top boot-block, where code of critical importance may be stored. The other input pin provides protection to the other blocks of the device. In addition, a set of programmable registers, containing locking flags, is utilized to implement software protection for each of the FM device blocks. These registers are accessible through the system's standard memory space and therefore can be altered by a malicious program (e.g., a virus) operating in the machine memory.

Each FM block has its dedicated lock flags register, which is utilized to set access restrictions. The lock flags consist of a read-lock flag, which prevents a block read operation, a write-lock flag, which prevents the block erasure and program operations, and a lock-down flag which prevents any further changes to the read and write lock flags, until the device is reset or power-cycled. The hardware pins implement a robust block protection, but additional hardware is required to enable updating of the content of the FM block, and a technical skilled operator is required, when jumpers or dip switches are utilized for that purpose. In addition, the program, which is used to set the lock flags and update the FM, is operated by the system processor, and therefore can be cracked and exploited by virus attacks. Furthermore, when the lock-down flags are activated, the access to the blocks' lock flags is completely disabled until the system is reset or power-cycled.

The combination of hardware and software protection can be utilized to add more protection levels and access control to the device blocks. In the Intel's Advanced+ Boot Block FM device, for example, hardware and software protection methods are combined to implement a protection scheme, which is software and hardware dependent. In this method, the state of an FM block may be modified by software to a locked or unlocked state. In the locked state, the block is fully protected from alterations, and in the unlocked state, the program and erasure of blocks is enabled. In addition, each block state can be changed by software to a locked-down state, in which the protection operation is hardware dependent. In the lock down state, the block state can be toggled between the locked and the unlocked states only when a dedicated input pin is held in its HIGH state ("1"). When the input pin is held in its LOW state ("0"), all the locked-down blocks enter the locked state, whether previously locked or unlocked, and no further changes can be made until the input pin returns to its HIGH state. The dedicated input pin is expected to be connected to a system element that will set it to a value of "1" only when appropriate. In Personal Computers (PC) it is typical to connect the input pin to a general purpose output that is controlled by the main processor.

The Advanced+ Boot Block FM device further comprises a one hundred twenty eight (128) bit Protection Register (PR). In the PR, security and authenticity information may be stored. The PR can be permanently locked to prevent any future changes to its contents. However, only sixty four (64) bits of the PR are available for the customer. One 64 bit segment of the PR section is programmed and locked at the factory, and may not be altered. Still, all the FM device operations are handled by the host processor and performed via software, so that the same procedures that are utilized by the system to handle the FM device operations may be exploited for a malicious purpose.

In advanced implementations the FM device is utilized to hold both host BIOS code and data, and code and data that belong to an embedded controller (EC). An example of such a system is the National Semiconductor PC87570 device. This device allows the use of one flash memory device by both the BIOS and the EC when operated in its Shared BIOS mode of operation. In this scheme, after the embedded controller is reset it configures the interface to the flash memory and enables the host access to it. An attempt by the host to access before that point will be responded to by extending the transaction via a ready signal (IOCHRDY) until the embedded controller has completed the setting up of the interface. Once the host access to the flash is enabled, the host and the embedded controller's core will access the flash via the PC87570's internal core bus and its Bus Interface Unit (BIU).

The core bus is arbitrated on a "first come first served" basis with a single transfer limit, thus neither of the two controllers (Host and EC) may prevent the other from accessing the flash for an extended period due to extended use of the flash. One of the embedded controller's tasks is to check the contents of the FM using a program stored in an on-chip ROM device, and apply a check-sum test which is verified utilizing data stored in a known location in the flash. The controller checks the portion of the FM that includes its own code and data prior to any attempt to execute it. In case an error is detected a flash update scheme is performed.

The host processor (the "Host") performs flash updates. Before an update starts, the Host software communicates with the EC to inform that an update start is desired. The EC will stop any access to the flash, for example by copying a small wait loop to RAM and executing it. Only after that, the EC acknowledges the operation to the Host that the flash update may begin. The Host will update any portion of the flash as required via a sequence of read and write operations that are bridged to it through the PC87570 core bus. The only FM contents protection available at this stage is one that is provided by the FM device (e.g., boot-block protection). When the update is completed the Host notifies the EC and a soft reset operation (i.e., jump to address zero ("0")) is enabled.

This scheme does not allow the EC any control over what information the Host may read from the flash, thus preventing holding the secured information in it. This prevents the ability to secure the update process.

All the methods described above have not yet provided satisfactory solutions to the problem of flash memory protection in personal computer implementations, in general, and in applications with shared memory schemes, in particular.

SUMMARY OF THE INVENTION

It is an object of the present invention to provide an apparatus and a method for protecting an FM device from malicious virus attacks and erroneous alterations.

It is another object of the present invention to provide an apparatus and a method for restricting access of an FM to Host processor sections of critical importance, thereby preventing undesirable FM content alterations.

It is a further object of the present invention to provide an apparatus and a method for providing an FM device with security and access management implemented with a dedicated embedded controller with hidden execution operation.

It is still another object of the present invention to provide an apparatus and a method for providing secure nonvolatile read and write operations in an FM device wherein the FM device content read is performed via an embedded controller and the write operation is performed with a secured key-cryptography method performed by the said embedded controller.

Other objects and advantages of the invention will become apparent as the description proceeds.

The present invention is directed to a method for protecting the content of a shared memory controlled by an embedded controller, by allowing dynamic setting of access permissions to, and/or updating and recovery of, the content. A computerized system comprising one or more Hosts linked to the memory device, access paths to the shared memory, to the Host and the embedded controller, and an arbitration device for allocating access paths to the memory device, is provided. The memory device is partitioned into separate blocks, each of which is designated for storing different types of data. A location is designated in the memory for storing protection information that includes data related to access operations allowed by at least one access path to a part of the memory. Access, via the arbitration device, to the separate parts of the memory is permitted or prohibited by using an access control unit that enables/disables access to predetermined portions of the shared memory by at least one of the access paths. Access paths to external monitoring/configuration devices may also be provided.

The protection information may be utilized by the arbitration device to permit or prohibit access to the memory device, or to portions of the memory device. An access path may be assigned for an external monitoring/configuration device that comprises a software development device, and/or a programming device of the shared memory, and is permitted or prohibited to access parts of the memory depending on the contents of the protection information. An access path may be assigned for an external monitoring/configuration device that comprises a production testing device and/or a programming device of the shared memory, and is permitted or prohibited to access parts of the memory depending on the contents of the protection information.

Preferably, the partitioning of the memory device may be carried out by allocating a first block for storing information and code required for the operation of the Host and/or the embedded controller and partitioning the first block into a set of sections. Partitioning is performed by designating a section for the storage of the Host's boot code, designating a section for the embedded controller boot code, and designating the remaining sections for storing remaining information and code required for the operation of the Host and/or the embedded controller.

A second block is allocated for storing protection information related to access permission to the memory device and for storing remaining information and code required for the operation of the embedded controller. The second block is partitioned into a set of sections, by designating a section for storing protection information and by designating a section for the remaining sections for storing remaining information and code required for the operation of the embedded controller.

The partitioning of the second block may further include designating a section for storing factory parameters in the second block and partitioning the second block into sections, including a section designated for the storing of the factory parameters. The access permission operation comprises setting access permissions for Host access path, by setting Host access to the Host boot section in the first block to permit only read operations; preventing Host access to the embedded controller boot section in the first block and to the second block; setting Host access to other sections of the first block to permit read, write and erase operations; setting access permission for the embedded controller access path, by setting access permission for the embedded controller access path to the embedded controller boot section, in the first block, and to the section containing protection information, in the second block, to permit only read operation and setting access permission for embedded controller access path to the Host boot section and the remaining sections in the first block, and to the remaining sections in the second block, to permit read, write and erase operations.

The access permission operation may further comprise setting access permission for the embedded controller access path to the sections designated for storing factory parameters, in the second block, to permit only read operation or setting access permission for the external monitoring/configuration device access path to the shared memory, so as to permit read, write and erase operations of each of the separate sections, except for the sections designated for storing the factory parameters, to which the access permission is restricted only for read operations, thereby permitting or prohibiting operations according to the information stored in the protection information section.

The access permission operation may comprise setting access permission for the access path assigned for an external monitoring/configuration device, access path, to the shared memory, so as to permit read, write and erase operations of each of the separate sections thereby permitting or prohibiting operations according to the information stored in the protection information section.

The access control unit may comprise sets of flags for enabling/disabling Host read and write/erase access to portions of the first block of the shared memory, which are set by the embedded controller and override any other access rights granted to the Host, and may further comprise sets of flags for enabling/disabling Host read and write/erase access to portions of the first block of the shared memory, which are set by the Host. The access control unit may further comprise sets of flags for enabling/disabling embedded controller write/erase access to portions of the first block of the shared memory, which are set by the embedded controller.

The present invention is directed to a method for performing boot operation in the Host and in the embedded controller of a computerized system employing a shared memory, by providing access paths to the shared memory, to the Host and the embedded controller; providing an arbitration device for allocating access paths to the memory; partitioning the memory into separate blocks, each of which is designated for storing different types of data; permitting or prohibiting access, via the arbitration device, to the separate parts of the memory by using an access control unit that enables/disables access to predetermined portions of the shared memory by at least one of the access paths; resetting the operation of the embedded controller by performing a validity test to determine the validity of parts of the shared memory whenever the "flash touched/untouched" flag is set. Whenever the parts of the shared memory are valid, the "flash touched/untouched" flag is set to the untouched state. The Host's read access from one or more Host's sections is enabled; a "no problem" indication to the Host is issued. The mode of operation of the embedded controller is changed into its normal operation mode. Whenever the parts of the shared memory are invalid, a "problem" indication to the Host is issued and a recovery procedure is started. Whenever the "flash touched/untouched" flag is not set, the process is repeated. The operation of the Host is reset by performing the Host's basic initializations and by waiting for an indication from the embedded controller indicating if the parts of the shared memory are valid or invalid. If a "problem" indication is issued by the embedded controller, a recovery procedure is performed and the operation of the Host and the embedded controller are reset. If a "no problem" indication is issued by embeddee controller, the Host's boot process is continued.

A flash update operation may be performed by allowing the Host to carry out update operations by providing the embedded controller the update data accompanied by its digital signature, and waiting for the embedded controller to issue an indication whether the update data is valid. If an invalid indication is issued, the update procedure is terminated. If a valid indication is issued, the "flash touched/untouched" flag is set to its touched state, then enabling Host write operation to flash, then writing the update data to the parts of the shared memory, and upon completion of the write operation, issuing an "End" indication and waiting for the embedded controller to acknowledge the "End" indication, and allowing the Host to perform the Host's reset procedure after receiving an acknowledgment indicating the completion of update process by the embedded controller.

The embedded controller is allowed to carry out update operations by receiving the update data and accompanied digital signature that are provided by the Host and performing a validation test to the update data, and whenever the update data is invalid, issuing an "Error" indication and terminating the update procedure. Whenever the update data is valid, the embedded controller enables the update of parts of the shared memory to be performed by the Host by performing the following steps: setting the "flash touched/untouched" flag to its touched state; changing the mode of operation of the embedded controller into a "no memory access" mode and enabling the access of the Host to the memory device; indicating to the Host that an update may start; waiting for an "End" indication to be issued by the Host; and in response to the Host "End" indication, preventing further access by the Host to the shared memory and allowing a Host re-boot process by sending an acknowledgment.

The embedded controller may be allowed to search for access violation or any other illegal access attempts during the update of the memory section, and the embedded controller "End" indication is "Successful" if no violation is found or is "Error" if a violation is found.

The present invention comprises a recovery procedure comprising the following steps: allowing the Host to carry out recovery operation by providing the embedded controller with the update data to be utilized for the recovery of the parts of the shared memory; waiting for a "Start" indication to be issued by the embedded controller, and upon receiving the indication moving to next step; performing update procedure to update the parts of the shared memory, and when concluding the update procedure, issuing the embedded controller an "End" indication; performing Host reset; allowing the embedded controller to carry out recovery operation by receiving the update data, and performing a validity test to determine whether the update data is valid; performing embedded controller reset whenever the update data is invalid; issuing the Host a "Start" indication whenever the update data is valid, and performing update procedure and waiting for the Host's "End" indication to be issued, when the indication is issued performing embedded controller reset.

The present invention is also directed to an apparatus for protecting the content of a shared memory controlled by an embedded controller, by allowing dynamic setting of access permissions to, and/or updating and recovery of, the content, that comprises: a computerized system comprising one or more Hosts linked to the memory device; access paths to the shared memory, to the Host and to the embedded controller; an arbitration device for allocating access paths to the memory device; and an access control unit that enables/disables access to predetermined portions of the shared memory.

The present invention comprises a memory device that comprises a first block for storing information and code required for the operation of the Host and/or the embedded controller. The first block comprises the following sections: a section for the storage of the Host's boot code; a section for the embedded controller boot code; and remaining sections for storing remaining information and code required for the operation of the Host and/or the embedded controller.

The memory device of the present invention also comprises a second block for storing protection information related to access permission to the memory device and remaining information and code required for the operation of the embedded controller. The second block comprises the following sections: a section for storing protection information; and a section for the remaining sections for storing remaining information and code required for the operation of the embedded controller.

The apparatus of the present invention further comprises access paths to external monitoring/configuration devices and/or Host boot code included in Host code. The apparatus of the present invention further comprises embedded controller boot code included in embedded controller code and/or means for utilizing the protection information, by the arbitration device, to permit or prohibit access to the memory device, or to portions of the memory device.

An access path may be assigned for an external monitoring/configuration device that may comprise a software development device, and/or a programming device of the shared memory, and is permitted or prohibited to access parts of the memory depending on the contents of the protection information. An access path may be assigned for an external monitoring/configuration device that may comprise a production testing device and/or a programming device of the shared memory, and is permitted or prohibited to access parts of the memory depending on the contents of the protection information. The second block may further comprise a section for storing factory parameters.

The access permission may comprise access permissions for Host access path, comprising: read only for Host access to the Host boot section in the first block; no access for the Host to the embedded controller boot section in the first block and to the second block, such that any operation in the sections is prohibited to the Host; and read, write and erase for the Host access to other sections of the first block to permit operations.

The access permissions may comprise access permissions for the embedded controller comprising: read only access permission for the embedded controller access path to the embedded controller boot section, in the first block, and to the section containing protection information, in the second block; and read, write and erase permission for embedded controller access path to the Host boot section and the remaining sections in the first block, and to the remaining sections in the second block.

The access permission may further comprise access permission for the embedded controller access path to the sections designated for storing factory parameters, in the second block, to permit only read operation. The access permission may further comprise access permission for the external monitoring/configuration device access path to the shared memory, so as to permit read, write and erase operations of each of the separate sections, except for the sections designated for storing the factory parameters, to which the access permission is restricted only for read operations, thereby permitting or prohibiting operations according to the information stored in the protection information section.

The access permission operation may comprise the step of setting access permission for the access path assigned for an external monitoring/configuration device, access path, to the shared memory, so as to permit read, write and erase operations of each of the separate sections thereby permitting or prohibiting operations according to the information stored in the protection information section. The access control unit may comprise sets of flags for enabling/disabling Host read, write and erase access to portions of the first block of the shared memory, which are set by the embedded controller and override any other access rights granted to the Host. The access control unit may further comprise sets of flags for enabling/disabling Host read, write and erase access to portions of the first block of the shared memory, which are set by the Host.

The access control unit may further comprise sets of flags for enabling/disabling embedded controller write/erase access to portions of the first block of the shared memory, which are set by the embedded controller. The access permission to the content of the shared memory may be enabled/disabled according to the data stored in the protection information block.

The foregoing has outlined rather broadly the features and technical advantages of the present invention so that those skilled in the art may better understand the Detailed Description of the Invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broader form. Before undertaking the Detailed Description of the Invention, it may be advantageous to set forth definitions of certain words and phrases used throughout this patent document: The term "section" is meant to include any portion of a block of a memory device. The term "JTAG Interface" refers to an access path to the memory device provided for carrying out boundary tests. The term "Parallel Interface" refers to an access path to the memory device provided for programming and configuring the device during manufacture.

The terms "include" and "comprise" and derivatives thereof, mean inclusion without limitation, the term "or" is inclusive, meaning "and/or"; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation. Such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document. Those of ordinary skill in the art should understand that in many instances (if not most instances), such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIGS. 3a, 3b, 3c and 3d schematically illustrate bits functionality of the Protection Word, the Shared Memory Host Access Protect registers (SMHAP), the Shared Memory Core Control and Status register (SMCCST) and the Shared Memory Host Semaphore register (SMHSEM);

DETAILED DESCRIPTION OF THE INVENTION

Figure 1:
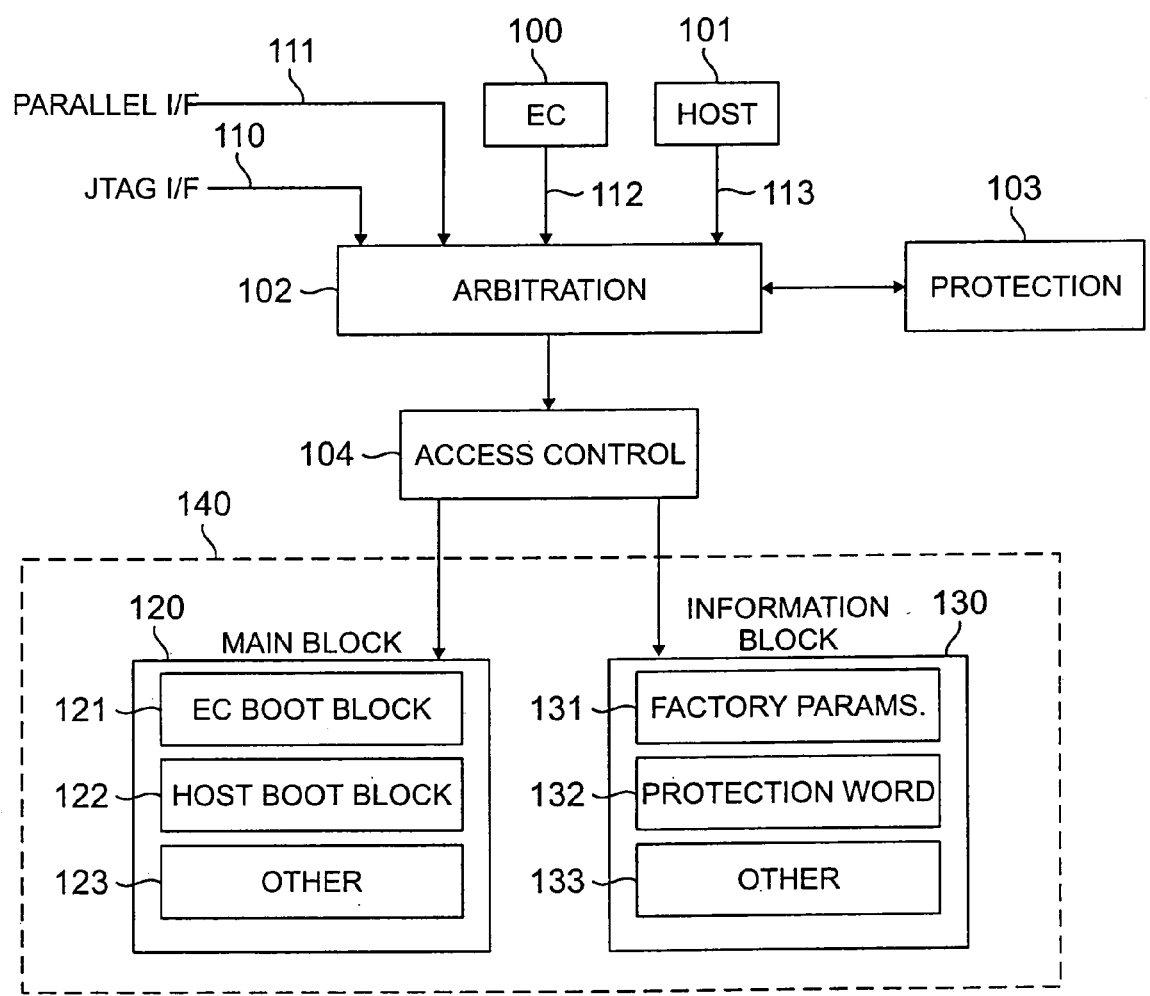
FIG. 1 schematically illustrates the flash memory device blocks and their partitioning and access protection, according to an advantageous embodiment of the present invention.

Flash Memory (FM) technology is very attractive for BIOS device implementations because it allows the contents of BIOS devices to be easily erased and reprogrammed on board, by user operated software that does not require any special skills. For these reasons, FM devices are very vulnerable to malicious attacks such as computer viruses. Allowing changes of critical sections of the computer BIOS code to be performed by software dangerously exposes the BIOS code to executables that may be infected by viruses. A typical attack on an FM device may be through a virus program that will initiate an update of the FM without the user's knowledge. Alternatively, such attacks may be performed by interfering during an FM update initiated by the user, or even by the modification of the information received by the user for the purpose of update (especially when downloaded from the Internet).

Prior art FM protection methods usually use hardware and software to restrict access to the FM device blocks. However, in general these methods are not adequate since the operations of FM management are still performed by the Host processor. Moreover, since the content of the FM device needs to be updated from time to time, software must be provided to enable alterations of the access protection settings. Therefore, a virus or another parasite may program the device protection mechanism to suit its own needs, and utilize the device's service procedures to access its content. As for viruses, the results of such attacks are usually the cause of damage to the proper operation of the computer, which in many cases require the intervention of a skilled technician to correct. Such attacks may also cause an irreversible loss of information or even permanent damage to the system.

The present invention teaches a method for FM device protection in which an Embedded Controller (EC) is utilized to manage and control the device protection and access permission. The EC has access priorities and may change the access permission settings that were given initially to other components of the system. Moreover, the EC is alerted as access attempts to restricted areas occur, and it is capable of blocking any further access attempts when required. The EC code and operation are not observable to other parts of the system, and according to an advantageous embodiment of the invention, codes of critical importance (e.g., boot section) are stored in special FM sections which are write-protected to either the EC and the Host processor. To enable flexibility of the Host's access permission settings, software is used to restrict or permit the Host processor access to some parts of the FM. The Host and EC access restrictions are initially set by the system at start-up. During operation, the Host may change some of those settings, but the EC has superior priority over any of the Host access enable settings, and may override the Host settings at any time. In this fashion, sophisticated and efficient protection schemes are implemented.

FIG. 1 schematically illustrates the access paths, and access control to a FM device according to an advantageous embodiment of the invention. In the figure, FM device 140 comprises two independent FM blocks. The main block 120, which serves as a base memory, is used to store programs and constant data of the embedded controller (EC) 100 and the Host processor 101. The second FM block is the information block 130, which contains the device's specific parameters and user defined data.

To enable different access levels to different types of classified information, the FM blocks are partitioned into separate sections, as illustrated in FIG. 1. The main protected sections in main block 120 are:

EC boot block 121—a section dedicated for the EC boot code, and protected from corruption by the EC or Host.

Host boot block 122—a section dedicated for Host boot codes, and protected from corruption by the Host.

"Other" parts 123—this section is dedicated for general purpose, and the software enable/disable its protection.

The main protected sections in information block 130 are:

Factory parameters 131—this section holds various parameters and calibration information defined during the device's production, and is protected from all alterations, while the device is inserted in the system.

Protection word 132—this section contains information about the flash data protection, which is used to restrict write or erase access to parts of or the entire FM device. Only the JTAG or the parallel interface (I/F) may change this.

"Other" parts 133—this section is dedicated for general purpose, and its read and write is allowed for the JTAG, the parallel I/F and the EC software.

The FM blocks are further partitioned into smaller sections, known as pages. Read and program operations are performed at the byte or word level, while the erase operation is performed at the page level or at the section level (sections are the combination of several consecutive pages into a larger memory section that may be erased at one time). In program operations, bits in the flash are modified from a logic value of "1" to a logic value of "0". In erase operations bits in the erased area (page or section) are all set to a logic value of "1". The FM device may be read, written or erased through several access paths 110–113, with different levels of FM contents protection. The access paths are: the JTAG path 110, the parallel interface path 111, the EC path 112, and the Host path 113.

Before discussing an advantageous embodiment of the invention in detail a brief discussion of the Parallel Interface (I/F) and the JTAG Interface (I/F) would be helpful. The Parallel Interface is used during the testing of the device as part of its manufacturing process. At this phase the "factory parameters" are loaded into the device. It may be also used for programming the FM prior to assembling it in the system, using a special memory programmer (such as those commercially available from Data I/O). The JTAG Interface is used to program the FM after it is assembled in its application board (or as an option for a pre-assembly programming as well). This may be done as part of the final system manufacturing, during the debug process of the flash contents or as part of failure recovery performed by a trained technician.

The access attempts performed via the access paths 110–113 are controlled by the arbitration unit 102, which permits or restricts the requested access. A protection mechanism 103 is utilized to direct arbitration unit 102 as to the access privileges of the different access paths 110–113. The access permissions, as will be explained later, depend on the access path that is utilized and on the flag settings in protection word 132. The access to the different FM device blocks is further protected by an access permission scheme, implemented by access control 104. In access control 104, software and hardware protection means are combined to generate a set of access permission levels for the various operations (i.e., read, program and erase) which are available for the Host, for the EC, through the JTAG I/F and through the Parallel Interface.

The arbitration unit 102 provides access to the FM device in accordance with the protection mechanism 103 settings. The protection mechanism 103 holds the information regarding the size of the EC and Host boot sections, 121 and 122 respectively. Thereby, the access permission to the EC and Host boot sections is granted in respect to the protection mechanism 103 settings. Protection mechanism 103 is further used to disable access via the JTAG and Parallel I/Fs, which are mainly used during the device's manufacture testing, and system manufacturing, testing and maintenance.

In FIG. 3a, protection word 132 is depicted. Protection word 132 is stored in the flash protection word and is read into a register after every reset and after every update of the flash by the JTAG I/F or the Parallel I/F. Bits 0–3 of protection word 132 define the size of the EC boot block. For example, setting 0–3 bits to "1000" will allocate a forty eight kilobyte (48 Kbyte) EC boot block. Bit 4 of protection word 132 defines the use and size of the Host boot block section. When bit 4 is clear, this bit specifies a sixty four kilobyte (64 Kbyte) area at the end of the memory, otherwise the boot block section is not available. Bits 7, 8 and 9 of protection word 132 enable FM contents protection from access attempts initiated by the JTAG Interface and by the Parallel Interface. When any one of these bits is cleared to zero ("0"), all Parallel Interface and JTAG operations are disabled except for "Special Erase". "Special Erase" is an operation in which the entire contents of the FM are erased and thus any secret kept in it is destroyed. Protection word 132 is read by hardware from information block 130, as part of the reset sequence. Once the protection word bits are read, the main block partitioning is established and the Host and EC paths access restrictions can be determined by protection mechanism 103.

Figure 4:
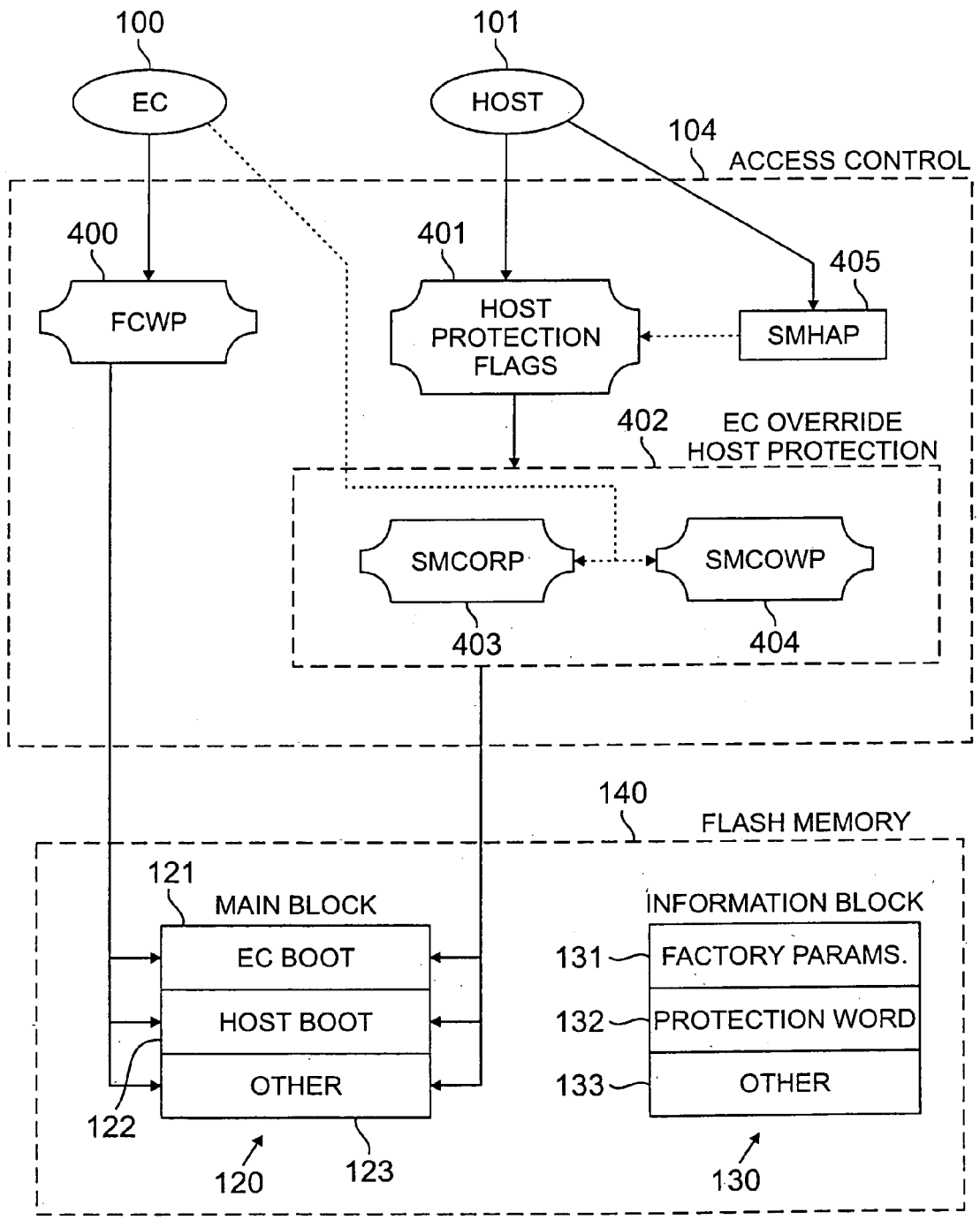
FIG. 4 schematically illustrates the access control registers and the protection scheme performed by the registers shown in FIG. 3.

The FM sections, whether accessed by the EC or the Host, will be referred to hereafter as the shared memory. FIG. 4 schematically illustrates the Host and the EC shared memory access control scheme, which is implemented by access control unit 104. Access control unit 104 comprises programmable registers and flags, which are utilized to set access permissions to the various sections of the shared memory.

Host protection flags 401 comprise read, write and lock flags. The flag setting is utilized to define sixty four kilobyte (64 Kbyte) block read and write permissions. In this fashion, the read and write flags are used to set access restriction on Host access to FM main block sections. The lock flags, when activated, disable any further changes to the specific block flags, until a reset of the system is performed.

The Host read, write and erase protection flags 401, can be programmed via the "Shared Memory Host Access Protection" (SMHAP) register 405. The Host protection flags are set during start-up to a pre-defined default setting, and may be reprogrammed later by the Host, to enable Host read and write operations and even a lock of desired flag settings. If the Host activates a lock flag, the block flags' setting is locked and no further changes can take place until a system reset is performed.

In addition, for the purpose of supporting EC controlled protection over specific sections, EC 100 can override the Host settings by "EC Override Host Protection" mechanism 402. This function is utilized with "Hidden execution schemes." The override may only take away access rights that the Host took to himself. There are two registers: (1) SMCORP 403 in which each of its bits control the override on Host read accesses from a specific shared memory block, and (2) SMCOWP 404 in which each of its bits control the override on Host write accesses to a specific shared memory block. The sections cover the whole address space of the shared memory, using blocks that are equal in size or of various sizes. In a specific advantageous embodiment, the first one hundred twenty eight kilobytes (128 Kbyte) of the shared memory use eight kilobyte (8 Kbyte) sections and the rest of the memory consists of sixty four kilobyte (64 Kbyte) sections. Upon reset all Host write accesses are blocked and Host read accesses are enabled only to the Host Boot Block 122 (if such a block exists).

Access restrictions on the EC access to the FM are imposed via the "Flash Core Write Protect" (FCWP) register 400. Each of the FCWP register's bits is utilized as a write protect flag dedicated to a specific block (e.g., eight kilobyte (8 Kbyte) blocks) of the FM's Main block section 120. The EC write protection is determined according to the FCWP flags settings. Upon reset, the entire Main Block is write protected from EC write accesses. The EC write protection is intended to prevent accidental erase of sections of the EC flash only. A section that is designated as an EC boot block is always write protected. The EC may change the write protection state of any of the Main Block sections at any time, except for the Host and Core boot blocks that are always write protected. The EC read access to any FM section is not limited.

It should be noted that in any case, the Host cannot access information block 130. Information block 130 does not have dedicated protection bits for EC writes, but some sections of it (that contain factory parameters 131 and protection word 132) are write protected from EC write accesses at all times.

FIG. 3b illustrates the structure of SMHAP register 405. In an advantageous embodiment of the invention, each of the SMHAP flags is responsible for a specific Host access permission to an FM block of sixty four kilobytes (64 Kbytes). Bit "zero" (bit "0") of SMHAP register 405 is utilized for setting the Host read protection flag. Bit "one" (bit "1") is utilized for setting Host write protection flag of the block. Bit "two" (bit "2") is utilized for setting the lock flag of the block. Bit "three" (bit "3") is utilized to halt the protection flag setting during index update. Bits 4 through 7 determine the Host Access Protection Index, which is utilized to select the block on which the indicated flags settings should take effect. In this fashion, to modify Host block protection flags, bit 3 is set to a logical value of "zero" ("0") and the desired index is written to bits 4 through 7 and the desired flags are written to bits 0 through 2.

To read the flags settings, the Host should write the index of the desired block (by writing a logical value of "one" ("1") to bit 3 and the desired index value to bits 4 through 7). Then the Host should read the register. The read returns both the index and the flags. The index should then be compared to the one written, to make sure that no write operation took place by an interrupt routine. If the compare fails the process should be repeated.

Figure 2:
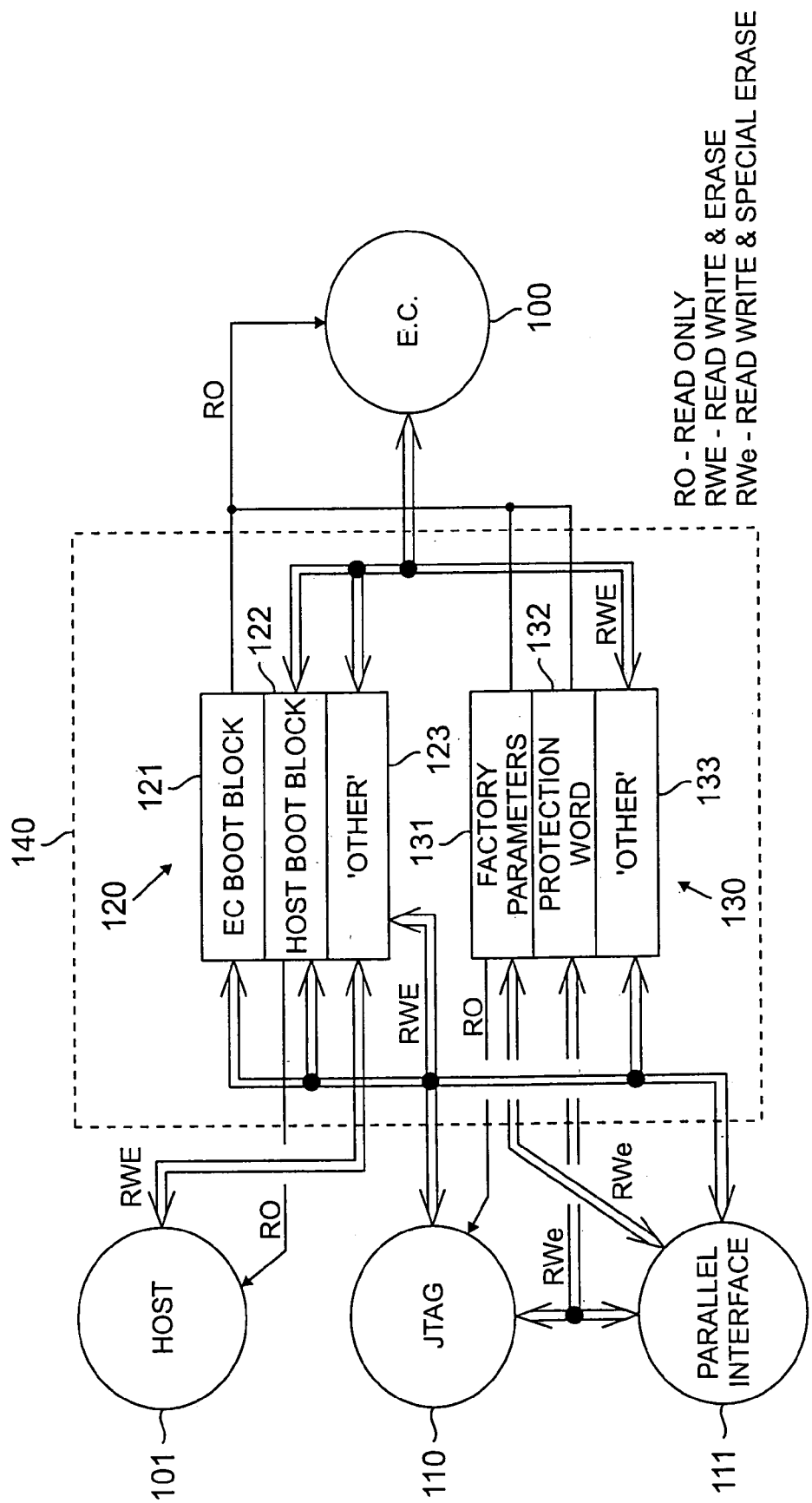
FIG. 2 schematically illustrates the access levels that are granted to the different access paths according to an advantageous embodiment of the present invention.

FIG. 2 schematically illustrates the different access levels available to each of the different FM blocks via the access paths, in an advantageous embodiment of the invention. After the system's startup is completed, the access control grants each of the access paths a set of access levels to the FM device sections, according to the protection registers and the Host read and write protection flags. The access levels available to each of the paths 110–113 (see FIG. 1) are set during the device startup sequence (i.e., boot), per information read from a fixed location in the flash named "Protection Word" 132. These are hardware settings, and some alterations of the settings may take place, as discussed above. With reference to FIG. 2, the access to Main Block 120 is permitted to EC 100, Host 101, the JTAG I/F and the Parallel I/F. Information block 130 access is permitted to EC 100, to the Parallel I/F and to the JTAG I/F (but not to Host 101).

The access levels, read, write and erase, which are available for each of the access paths, are illustrated in the form of arrowhead lines. The EC access levels for main block 120 are:

EC boot block 121—Read Only ("RO").
Host boot block 122—Read Write and Erase ("RWE").
"Other" main block section 123—Read Write and Erase ("RWE").

The EC permission levels for information block 130 are:
Factory parameters block 131—Read Only ("RO").
Protection Word block 132—Read Only ("RO").
"Other" information block section 133—Read Write and Erase ("RWE").

The Host access is very limited in order to avoid unauthorized alteration of sections of critical importance. For this reason, the Host boot section is read only ("RO") for Host access, and the only section that the Host can gain write permissions is the "other" section 123 of main block 120, wherein Host read, write and erase functions ("RWE") are permitted. The rest of the FM device sections are completely restricted for Host accesses. The Host has no access to EC boot block 121 since it does not include any information of interest to the Host nor does the Host update it.

The JTAG I/F and the Parallel I/F access is only partially limited, since the entire device is programmed and tested through them. Still referring to FIG. 2, RWE access levels are granted to the JTAG I/F and to the Parallel I/F for the access to the main block 120 sections 121–123, and the "other" section 133 of information block 130.

The protection word 132 settings may block JTAG I/F and Parallel I/F read and write access attempts, through one or more access disable bits. However, only when protection word 132 settings enable the JTAG I/F and the Parallel I/F read and write access, may the content of protection word 132 be altered. Complete erase of the entire flash contents, excluding the factory parameters 131, is always allowed via the JTAG I/F and Parallel I/F. This enables the protection of flash contents from snooping attempts through these interfaces. It also protects the information in the flash from any read other than the one allowed by EC 100. The JTAG I/F and the Parallel I/F may read and write the contents of protection word 132, as long as it is not protected. If protection word 132 disables the JTAG I/F and the Parallel I/F accesses, a special erase command may be initiated by those sources, which erases the entire FM device, except for the factory parameters 131. The factory parameters 131 may be erased and programmed through the Parallel I/F only. Its erase is enabled only as part of an extended special erase. This is done to protect the information in this section from an erroneous erase that will cause the loss of information that may be provided only at the factory (e.g., parameters achieved during testing). JTAG I/F access to the factory parameters 131, is read only ("RO"), and during manufacturing this I/F may be used to program the device as well.

Figure 7A:
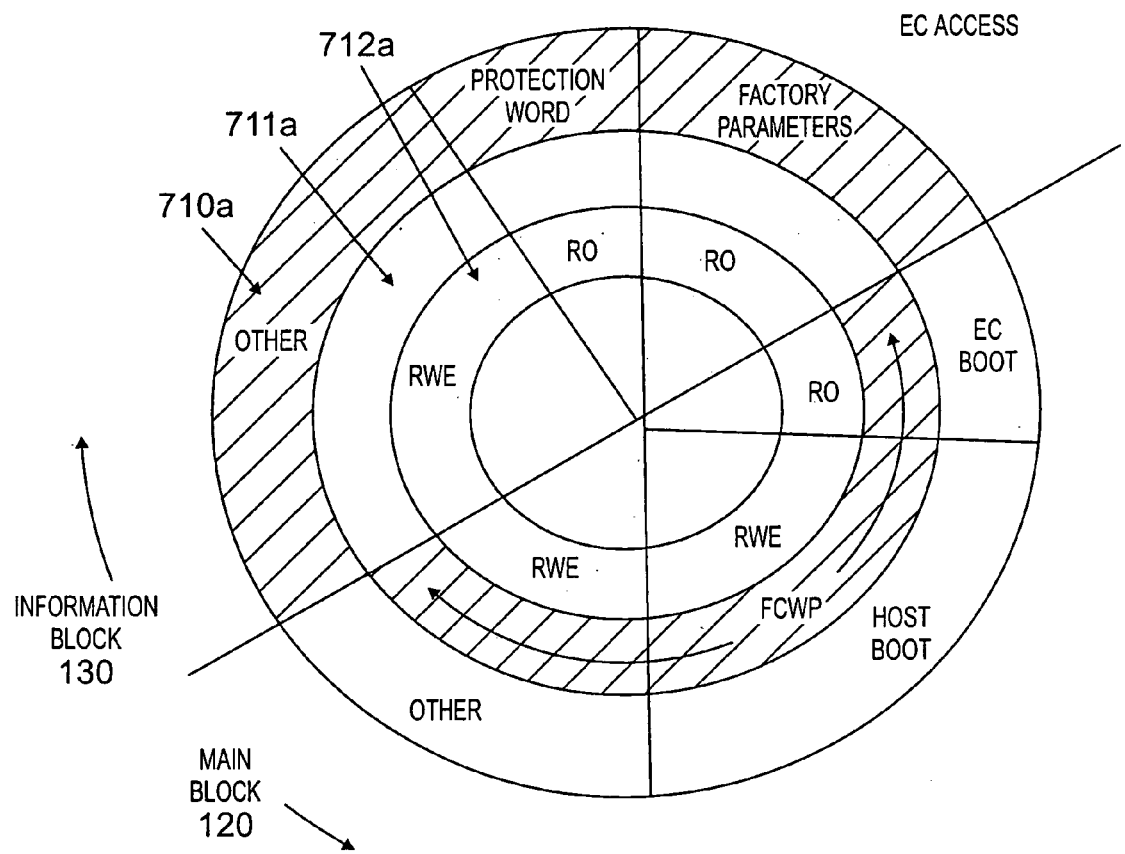
FIGS. 7a, 7b, and 7c schematically illustrate the access levels of each of the access paths to the different memory sections.
Figure 7B:
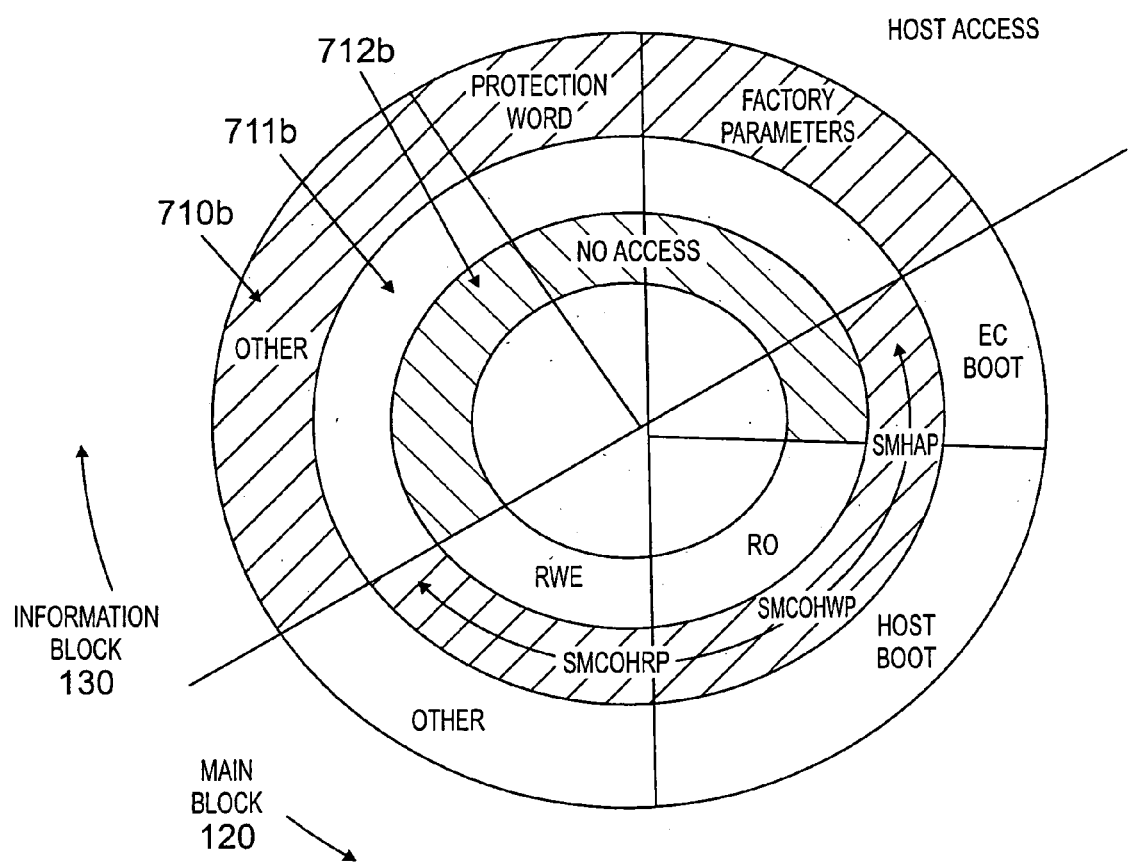
Figure 7C:
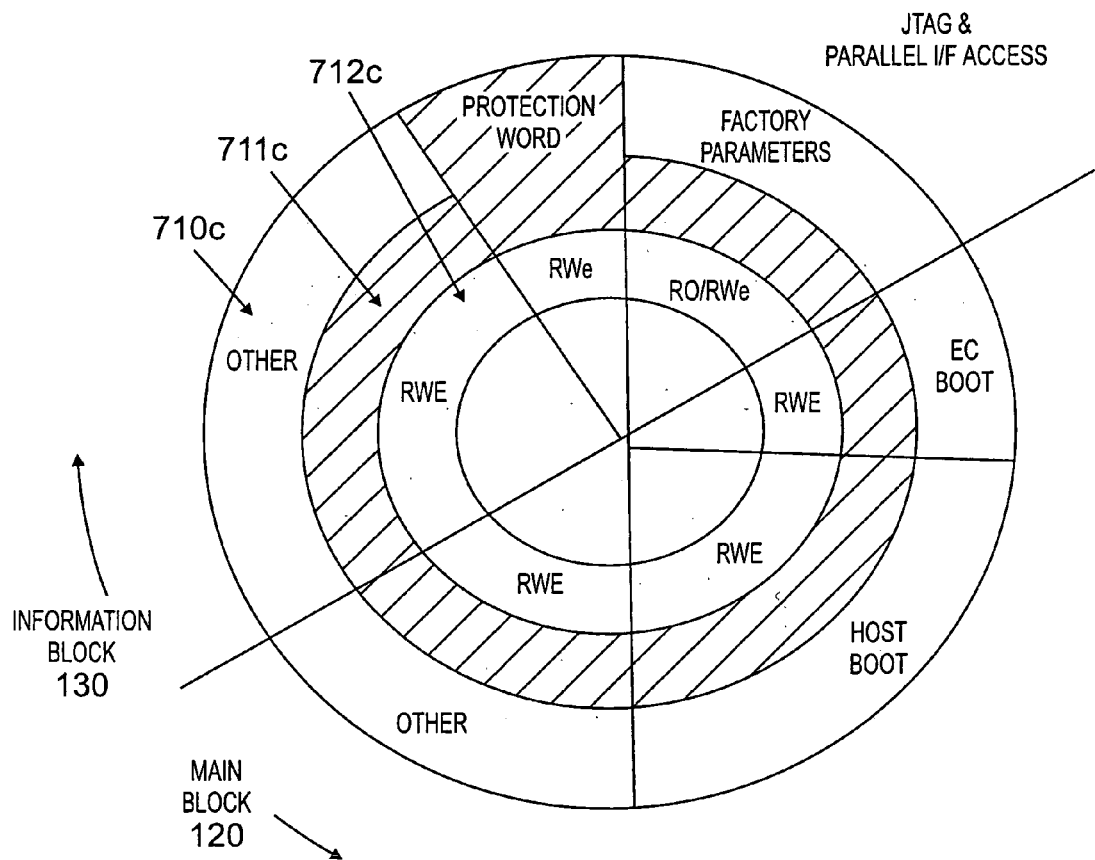

To further illustrate the invention described herein, FIGS. 7a, 7b and 7c are provided, in which the access levels are depicted in conjunction with access control 104 and protection unit 103. In these figures, the access protection is depicted in the form of rings. The outer rings 710a, 710b and 710c schematically illustrate the FM sections 121–123 and 131–133. The inner rings (i.e., the interior rings which follow the outer rings in order) 711a, 711b, and 711c schematically illustrate access control unit 104. The rings 712a, 712b, and 712c (i.e., the third rings in order in each of the FIGS. 7a–c) schematically illustrate access levels according to an advantageous embodiment of the invention.

The protection rings are partitioned into two distinct blocks, main block 120 and information block 130. The rings are further partitioned into the EC boot section (121), the Host boot section (122), the main block's "other" section (123), the factory parameters section (131), the protection word (132), and the information block's "other" section (133).

As depicted in FIG. 7a, the protection mechanism does not impose any read access restrictions on EC 100. However, the scope of the write access levels to the main block 120 Host Boot Block 122 and EC Boot Block 121 is defined by hardware during reset and obtained by bits 0 through 3 and bit 4 of protection word 132. The entire main block 120 is protected from EC writes, by the FCWP register 400 that is cleared by hardware on reset. The FCWP bits may be later used to enable write access to the Host Boot block 122 and "Other" section 123 of main block 120. It should be noted that once EC Boot Block 121 is allocated (by bits 0 through 3 of protection word 132), the respective bits in the FCWP register 400 that determine the access permissions to EC Boot Block 121, are set with fixed values and cannot be altered thereafter (until reset or "power down"). In this manner Host access to EC Boot Block 121 is permanently blocked. Write accesses by EC 100 to EC Boot Block 121 are also permanently blocked.

In FIG. 7b the Host protection mechanism is described, by rings 710b–712b, which illustrate the access levels scope to the FM sections. The SMCORP register 403, the SMCOWP register 404, and the SMHAP register 405 determine the Host's access control to the FM sections. The SMCORP register 403 bits and the SMCOWP register 404 bits are set by EC 100 to override Host access settings defined by the SMHAP register 405. The access level depicted in the third ring 712b illustrates the limitations of the Host access. The Host never gains access to information block 130 and EC Boot Block 121. The Host may read the Host Boot Block 122 at main block 120, and read and/or write the "other" section 123 of main block 120, but only if it is enabled by SMCORP resister 403 and/or the settings of SMCOWP register 404 and SMHAP register 405, respectively. Upon reset SMCORP register 403 and SMCOWP register 404 are set so that all reads, except from Host Boot Block 122, are prevented.

In FIG. 7c, the JTAG I/F and the Parallel I/F read and write accesses are completely enabled or disabled by the settings of protection word 132 (i.e., bits 7 through 9), as depicted by ring 710c. No software limitations are imposed by the access control ring, 711c. The JTAG I/F and the Parallel I/F access levels are unlimited to most of the FM block sections. The Parallel I/F (Read, Write and Special Erase ("RWe") access permissions) may be used to change factory parameters 131 during manufacturing. The JTAG I/F, however, may only read the settings of factory parameters 131. In addition, the JTAG I/F and the Parallel I/F are the only access paths that may change the settings of protection word 132, but only when their access is granted by protection word 132. At any time a special erase by the Parallel I/F or the JTAG I/F may be used to completely erase all information from the flash, excluding factory parameters 131 that can be erased only by the Parallel I/F. This allows reprogramming of the device when, for example, one of the boot blocks is damaged.

Figures 3C, 3D:
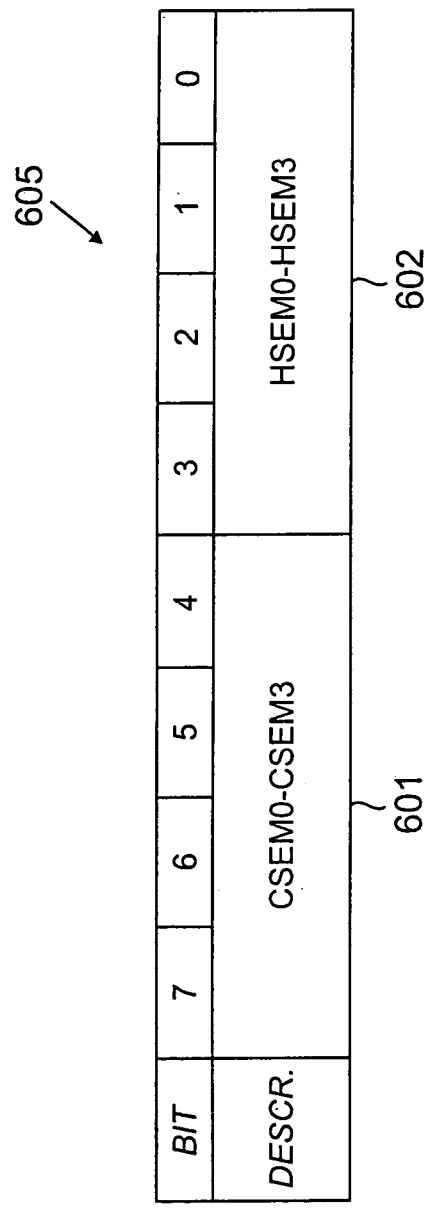

The Host operations are reflected by the "Shared Memory Core Control and Status" (SMCCST) register (illustrated in FIG. 3c). The SMCCST control and status is utilized by EC 100 to control and monitor the Host operations on the shared memory in general, and the FM device in particular.

FIG. 3c depicts the SMCCST register bits, wherein bit "zero" (bit "0") the "Host Read Error" bit (HRERR) is utilized to indicate a Host read error, indicating an attempt to read from a read-protected space or an out-of-range address. Bit "one" (bit "1") of the SMCCST register, the "Host Write Error" bit (HWERR) is utilized to indicate Host write error, when the Host makes an attempt to write to a protected memory location or an out-of-range address. This includes attempts to erase protected sections. Bit "two" (bit "2") of the SMCCST, the "Host Error Interrupt Enable" bit (HERRIEN) is utilized to enable an interrupt to EC 100 whenever a Host error occurs. Bit "three" (bit "3") and bit "four" (bit "4") are the "Host Error Response" field that determines the response type on Host errors. Bit "five" (bit "5") of the SMCCST register is the "Host Lock" bit (HLOCK). This bit is cleared to prevent Host write operations to the shared memory. When bit 5 is set it enables Host write operations. Bit 5 is utilized by EC 100 for arbitrating the long "blocking" erase and program operations by the Host. Bit "six" (bit "6") and bit "seven" (bit "7") of the SMCCST register are the Host Semaphore Write bit (HSEMW, 603 in FIG. 6) and the Host Semaphore Interrupt Enable bit (HSEMIE) respectively. Bit 6 and bit 7 are utilized 5 to indicate the Host's operation/state. The operation of bit 6 and bit 7 and will be more fully explained later.

The HERES field (i.e., bit 3 and bit 4) of the SMCCST register has three options for handling error conditions. The selection between them depends on the ability of the Host to handle the error condition. The default setting is "zero zero" ("00") and is selected after reset. In this case, read operations are extended using a not ready indication (for example "long sync" on the LPC bus), an error condition is flagged internally, and the transaction will be completed when the access prevention is removed or when the error handling scheme changes. Write operations in this case are ignored and only flagged as an error. This scheme is used upon reset, when access to the boot block data or any other data is not enabled yet and needs some more EC activity. On the other hand, the Host does not have the code to handle any error conditions.

The next option for the HERES field is "zero one" ("01"), which defines "return 00h on reads and ignore write operations." This option is used to prevent the Host from getting stuck due to an access to data that is protected from read by the Host. In this case the Host will receive a fixed data (for example, 00h) that will allow the memory transaction to complete. Write transactions are completed from the Host perspective, an error is flagged but the data written is ignored.

The third option for HERES is "one zero" ("10"), which defines "return Error SYNC for both reads and writes." In this option an error indication is sent back to the Host as an erroneous termination of the transaction (for example, using the LPC "Error SYNC" response). This allows error handling software on the Host to trap the software that causes the violation and handle it. In parallel an indication of the violation is sent to EC 100.

It should be noted that once read or write access is allowed the access itself may be deferred due to arbitration over the EC core bus. In such a case the Host transaction is extended or a busy flag is kept set (for writes), but no error is flagged and the transaction is completed normally.

The HLOCK bit (bit 5 of the SMCCST register) is used to enable write operation of the Host to the FM. This is required since write operations to the FM are usually non-atomic operations. Thus the bus arbitration scheme is not sufficient to prevent mixing the Host operations and the EC operations to the same FM device. When cleared, Host write accesses to the shared memory are treated as an error, regardless of the access protection settings. After the EC has determined that the Host may write to the memory (the mechanism for that will be discussed later on), it configures its software in a way that will not access the FM device (for example, by executing code from a different FM device or RAM), then EC 100 sets the HLOCK bit enabling the Host access to the FM. Lastly, EC 100 indicates the completion of this process to Host 101.

Before EC 100 performs update to the flash, it should prevent Host 101 from accessing it through the use of the access override bits, and/or communicate the update to Host 101 to prevent it from reading the area and getting erroneous information. Additionally, once Host 101 completes the write operations to the FM it should produce an indication to EC 100 so that EC 100 can clear the HLOCK bit.

For some of the operations above, a signaling interface between EC 100 and Host 101 is required. There are various ways to implement it. An example of such an interface is the EC interface defined in the ACPI standard. An alternative to that, which may involve less software overhead on EC 100 (mainly since it is dedicated to this function) is the signaling mechanism described herein.

Figure 6:
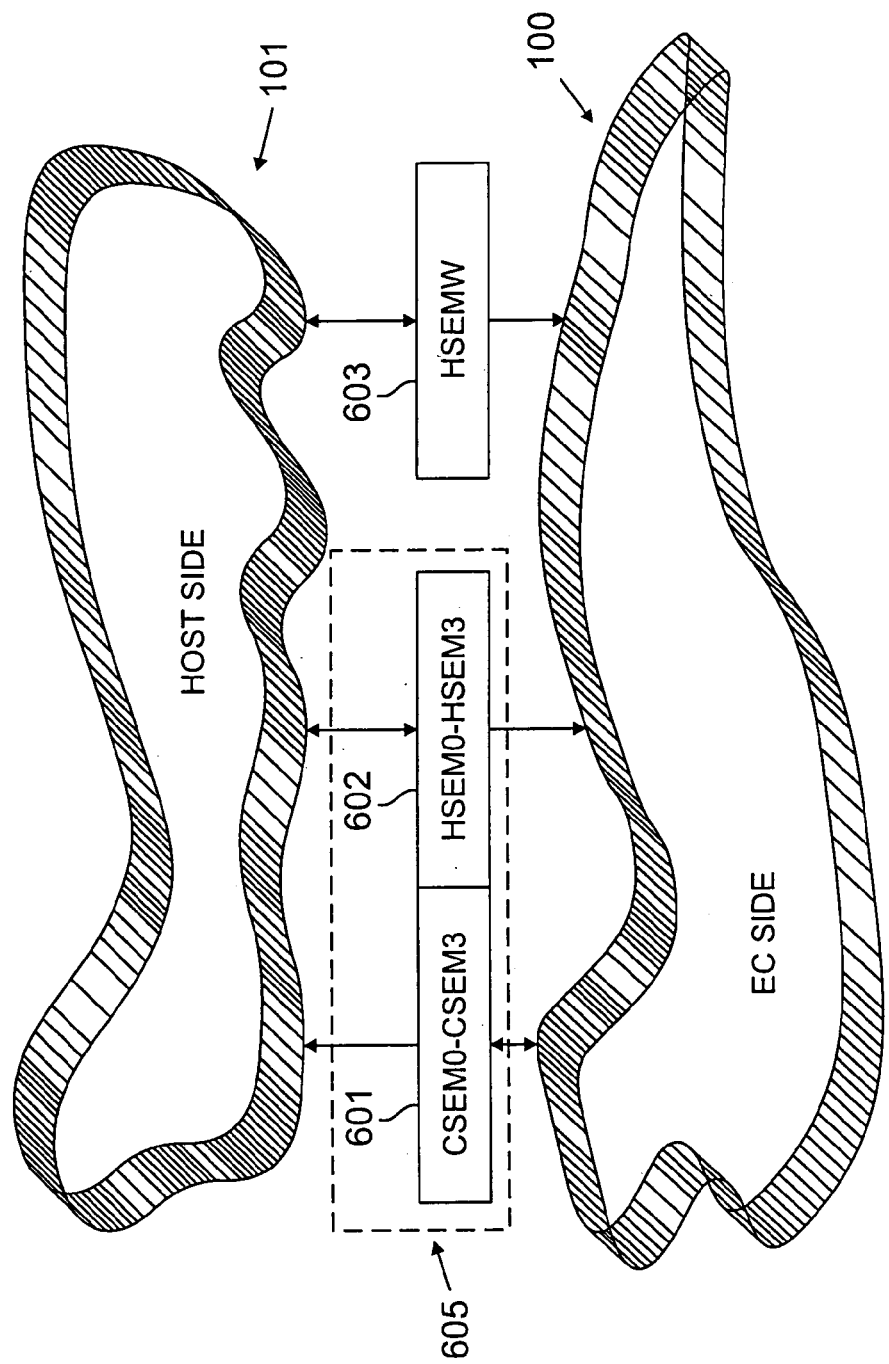
FIG. 6 schematically illustrates the signaling interface scheme in an advantageous embodiment of the present invention.

FIG. 6 schematically illustrates the signaling interface of an advantageous embodiment of the invention. The signaling interface comprises the Shared Memory Host Semaphore Register (SMHSEM) 605 depicted in FIG. 3d. The SMHSEM register consists of the EC's Semaphore bits, CSEM0–CSEM3601, and the Host's Semaphore bits, HSEM0–HSEM3602. Both EC 100 and Host 101 may read the content of the SMHSEM register. The CSEM bits 601 of the SMHSEM register are enabled for EC writes, and may be only read by Host 101 (read only). On the other hand, Host 101 is able to write to the HSEM bits 602, but EC 100 may only read them (read only) A write operation by Host 101 sets the "Host Semaphore Write" (HSEMW) flag 603 in the SMCCST register (FIG. 3c). If enabled (by setting the HSEMIE bit (bit 7) in the SMCCST register), an interrupt is sent to EC 100 to indicate a Host semaphore write. If interrupts are not used, EC 100 should use a polling scheme to monitor for Host semaphore changes. Single bits may be used for indicating various requests or state changes. For example, Host 101 may use one of the HSEM bits 602 to signal a request to write to the flash. EC 100 will use one of CSEM bits 601 (noted here as the "grant" flag) to signal that the bus is granted and the HLOCK is set, then Host 101 will clear its bit when the write is completed. In response, EC 100 will clear the grant flag just before releasing the HLOCK.

After reset, EC 100 has control over the FM, and Host 101 may access at most Host Boot Block 122. It is possible that no memory is accessible by Host 101 until proper configurations are done and then Host access to the boot block is enabled.

It is important to enable update of parts of the EC's code, constant data, and some Host code and potentially other information stored in the FM. The update of this information may be done by EC 100 or by Host 101. In many cases, such as a BIOS update operation, it is customary and convenient to do this operation using the Host. It is a purpose of the present invention to protect this update operation in a way that will reduce the damage in case malicious update operations occur.

The first step for this protection is to identify the Host update routine. This is done by asking for various identification information from the Host, through electronic signatures. Another assumption is that the updated information is signed using an electronic signature. A key that allows verifying this signature is stored in the FM in a protected way. The means for electronic signature and identification are well known in the art. Examples of algorithms used for this are the RSA public-private key identification and signing algorithms or the SHA-1 hashing algorithm used for generation of a "summary" of a document.

Figure 8:
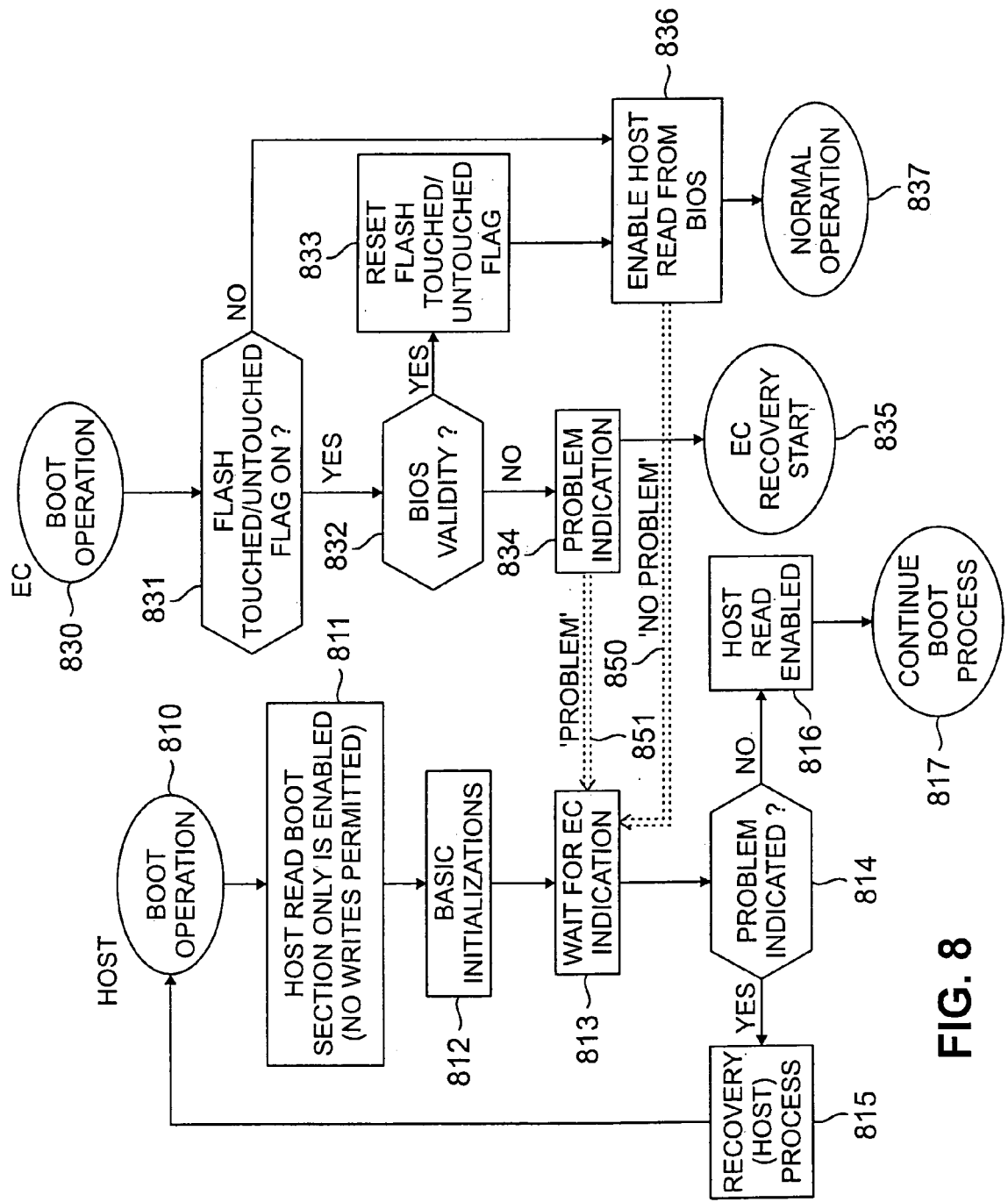
FIG. 8 illustrates the Host and the embedded controller boot operation in the form of a flow chart.

It is also assumed that either the FM is normally write protected and a flag is set (in part of the FM that is not accessible to the Host) to indicate when the flash contents may not be valid since the write protect was removed to enable update, and the FM is checked for validity (as illustrated in FIG. 8) when this flag is set. Or that the verification is done on every re-start of the EC, as if the flag test showed that it is invalid. It should be noted that the flash contents may be signed (digital signature) as one piece or in parts to allow partial updates of the flash.

The flow charts provided herein are an example of a way to use the hardware described to implement a secured FM contents update by the Host. The protection here takes the form of preventing execution (read) from invalid FM contents, and falling into an FM update recovery routine. Another way to securely store information in the FM is to pass the infonation between EC 100 and Host 101 through a communication channel (such as the ACPI EC channel) and let EC 100 store the information in the FM at the designated locations).

Figure 9:
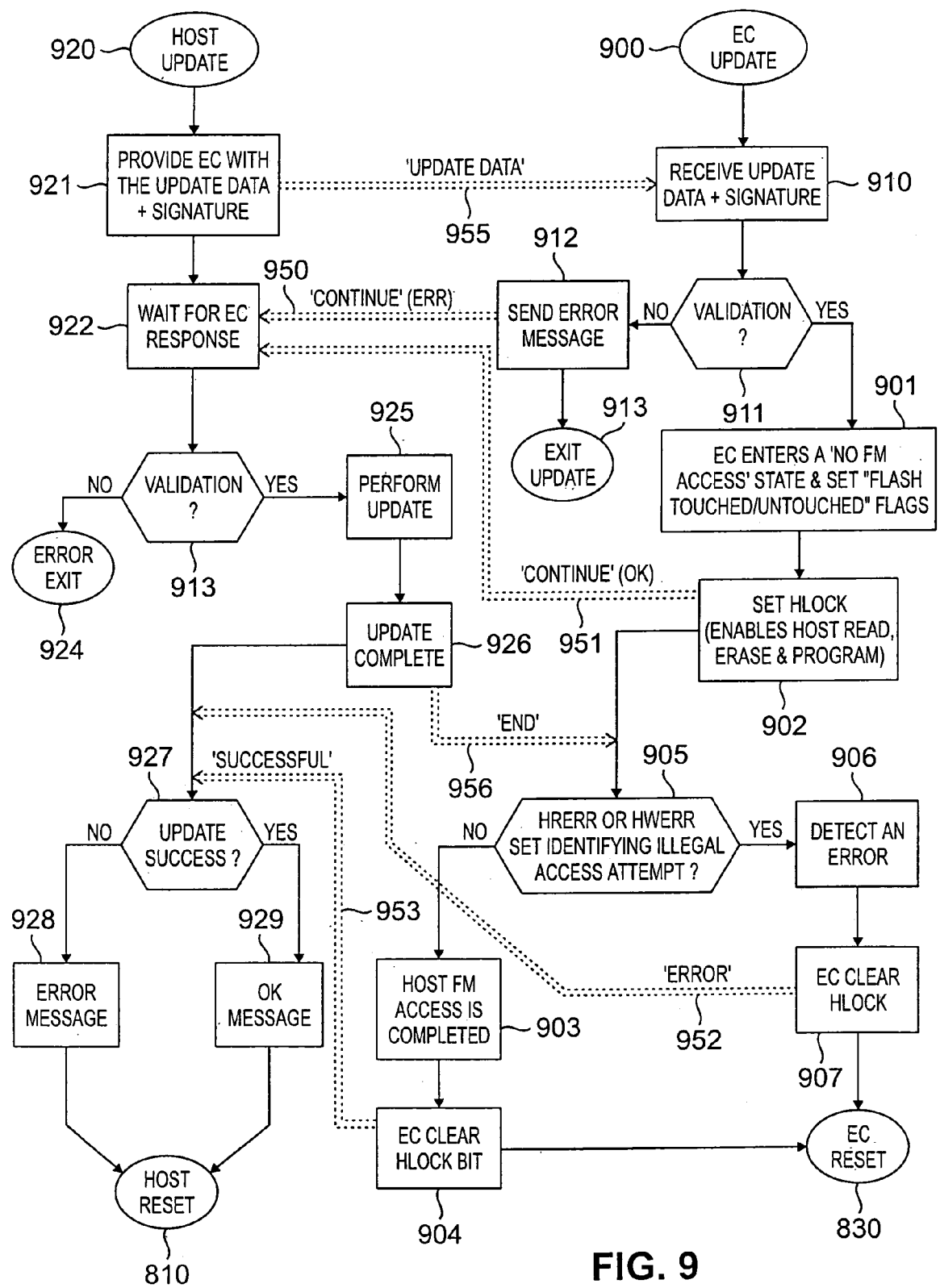
FIG. 9 illustrates the Host and embedded controller update procedures in the form of a flow chart.

FIG. 9 illustrates a flow chart that describes a process that is used for updating the flash protected areas by Host 101. Typically, EC 100 will be executing its code as Host 101 issues a request to gain control over the FM device and to start updating the FM. The Host's update process is initiated in step 920, and the EC's update process in step 900. Before any update can take place, in step 921 Host 101 provides EC 100 the "Update Data" accompanied by the digital signature on line 955. When Host 101 completes transmission of the "Update Data" and digital signature, it enters a wait state in step 922, in which the update procedure is halted until the EC's test results are received on line 950 or line 951. EC 100 receives the "Update Data" and digital signature in step 910, and performs a validation test utilizing the digital signature.

If it is found in step 911 that the "Update Data" is invalid, in step 912 EC 100 produces an Error message and signals to Host 101 an Error indication on line 950. EC 100 then exits the update procedure, as the control passes to step 913. If it is determined in step 911 that the "Update Data" is valid, the control passes to block 901 in which EC 100 enters a "no FM access" state in which the EC activities concerning the FM are avoided, additionally EC 100 also sets the "flash touched/untouched" flags (not shown). The "flash touched/untouched" flags are part of the FM and are located in a section enabled for EC read and write operations, and possibly (but this is not a must) for Host read operations. The bit may be maintained as a single bit or as part of a "flash file system" that maintains the flag and potentially other related information in a way that reduces the number of erase operations performed (various flash file systems are known in the art and may be used). The operation proceeds in step 902, in which EC 100 sets the HLOCK bit in the SMCCST register, thereby enabling Host's read, erase, and program permissions, and making Host update possible. In step 902 EC 100 also produces an indication on line 951, to signal to Host 101 that the "Update Data" is valid and that the update process may proceed.

Host 101 exits its wait state (step 922), when an indication concerning the "Update Data" validation is received on line 950 or line 951. When the validation is received, Host 101 determines how to proceed in step 913. If an "invalid" indication is received (i.e., "Error" indication on line 950), the Host update process is terminated as the control passes to step 924. If a "valid" indication is received (i.e., "OK" indication on line 951), the procedure proceeds in step 925 where the update is actually performed. In the next step, step 926, when the update is complete, Host 101 sends to EC 100 an "End" indication on line 956 to enable it to proceed. EC 100 exits the "no FM access" state when the "End" indication is received on line 956. Then, in step 905, EC 100 determines if there were any attempts by Host 101 to access restricted sections, by checking the HRERR and HWERR flags in the SMCCST register. The check in step 905 may be done in parallel to performing the update in step 925 or at its completion. The EC control may poll the status bits (HRERR and HWERR), or use interrupts, when the HERRIEN bit is set. If Host 101 did not try to access restricted sections the process continues as the control is passed to step 903, where EC 100 disables any further Host accesses and thereby completes the Host's FM operation. The operation proceeds in step 904, where EC 100 acknowledges the completion of the update process to Host 101, on line 953, and clears the HLOCK flag to cancel the Host's access permissions that where granted for the update process. Performing a soft reset in step 830 that re-initializes both EC 100 and Host 101 completes the operation.

On the other hand, if the HRERR flag or HWERR flag is set (in step 905), due to Host attempts to access a restricted section, EC 100 is alerted to handle the misbehavior by Host 101 in steps 906 and 907. EC 100 is able to determine whether the restricted access attempt was for read or write according to the SMCCST status bits HWERR and HRERR, and this is determined in step 906. The HLOCK is removed in step 907, disabling any further update operation by Host 101. EC 100 reports the error to Host 101, by producing an "Error" indication on line 952, then the EC's update process is stopped. At this point the flash content is invalid and a recovery scheme will be enabled as part of the next boot sequence initiated in step 830. The boot sequence is started by re-starting EC 100 and Host 101, a procedure that will be later discussed in detail.

The completion of the Host's update process depends on the indication it receives from EC 100 regarding the status of the HRERR flag or HWERR flag. In step 927, it is determined whether the update process was successful or defective. A successful process will be determined when a "successful" indication is received from EC 100 on line 953. In such a case, Host 101 produces a message indicating successful completion of the update process in step 929, and the update process is terminated as the control passes to step 810, in which the Host operation is re-started (Host reset). If an "Error" indication is received by Host 101 on line 952, it produces an error message in step 928, and the update process is also terminated in step 810 (Host reset).

Changes to the BIOS content may be performed when a BIOS update is required, or new hardware configuration settings need to be applied. BIOS changes will usually be followed by a system Boot operation. A full system Boot operation is not mandatory in all cases. When the update is limited in its scope, verification of its correctness before enabling Host read from that area might be sufficient. The system start-up according to an advantageous embodiment of the invention consists of BIOS validity tests, which are performed before the system can enter its normal Boot operation sequence. In FIG. 8, the start-up operation sequence of Host 101 and EC 100 is illustrated in the form of a flow chart.

The Host Boot operation sequence starts at step 810, wherein the Boot operation sequence is initiated. In general, Host reads and writes are completely disabled after Boot operation or update. However, to enable the Host Boot operation, read permission of Host Boot Block 122 is enabled at step 811, and then Host 101 will read this information to start the Boot operation process (in many cases a de-compress of the boot code from Flash to RAM is done). The Boot operation continues in step 812, in which Host 101 performs basic initializations. The basic initializations consist of establishing communication with EC 100 and entering a wait loop, at step 813, in which the Host processor awaits a special signal (for example, using the signaling interface) from EC 100 that confirms the validity of the BIOS content for further processing. Alternatively, the wait may be implemented using the "not ready" indication on the bus imposed when reads are disabled, as described previously. The steps just described herein (i.e., starting the Boot operation sequence on step 810, and entering a wait state on step 813) are programmed at the factory, and are write protected by definition (i.e., not subject to alterations).

Parallel to the Host's boot sequence, the EC Boot operation sequence takes place, starting at step 830, wherein the EC Boot operation sequence is initiated. In step 831 an update test is performed by EC 100. This is carried out by testing the "flash touched/untouched" flag. An update process is initiated if the flag is set by moving into step 832. This happens whenever an update process was started prior to the current startup. If the "flash touched/untouched" flag indicates that no update took place, control passes to step 836, in which EC 100 enables the Host BIOS read and sends to Host 101 a "no problem" indication on line 850 that permits continuation of the Host's Boot operation process.

In the event of a "flash touched/untouched" indication (i.e., the "flash touched/untouched" flag is "On"), control passes to step 832, in which a BIOS validity test is performed by checking if the FM contents match the expected signatures. The validity test is of crucial importance when alterations of the BIOS content are performed, since it enables recovery from malicious attacks and erroneous alterations of the device content. Assuming that the validity test results are satisfying, control passes to step 833, wherein the "flash touched/untouched" flag is reset, and the operation continues into its normal Boot operation sequence through step 836. As described above, in step 836, Host read permissions are enabled and EC 100 transmits a "no problem" indication on line 850. The EC Boot operation sequence is completed as the control passes to step 837 and EC 100 switches to "normal operation."

If the BIOS validity test results are not satisfactory, control passes to step 834 wherein a "problem" indication is transmitted on line 851, notifying Host 101 that a "problem" was detected. The EC Boot operation sequence is then terminated as control passes to step 835, in which EC 100 enters a recovery state.

When Host 101 receives the validity test results on line 851 or on line 850, the Host's Boot operation sequence proceeds as control passes from step 813 to step 814. In step 814, the path in which the Boot operation process continues is determined according to the validity test results. Assuming that the validity test results are satisfactory, control passes to step 816, wherein the Host read permissions are enabled and the Boot operation process continues, as the control passes to step 817.

When results of the BIOS validity test are unsatisfactory, Host 101 enters a recovery state, as control passes to step 815. When Host recovery is completed, the system is restarted, and the update and validity tests are performed again. In fact, this process will take place until the test results ensure that the BIOS content is valid and normal operation is possible (i.e., an infinite loop is established when the BIOS recovery is not established).

Figure 5:
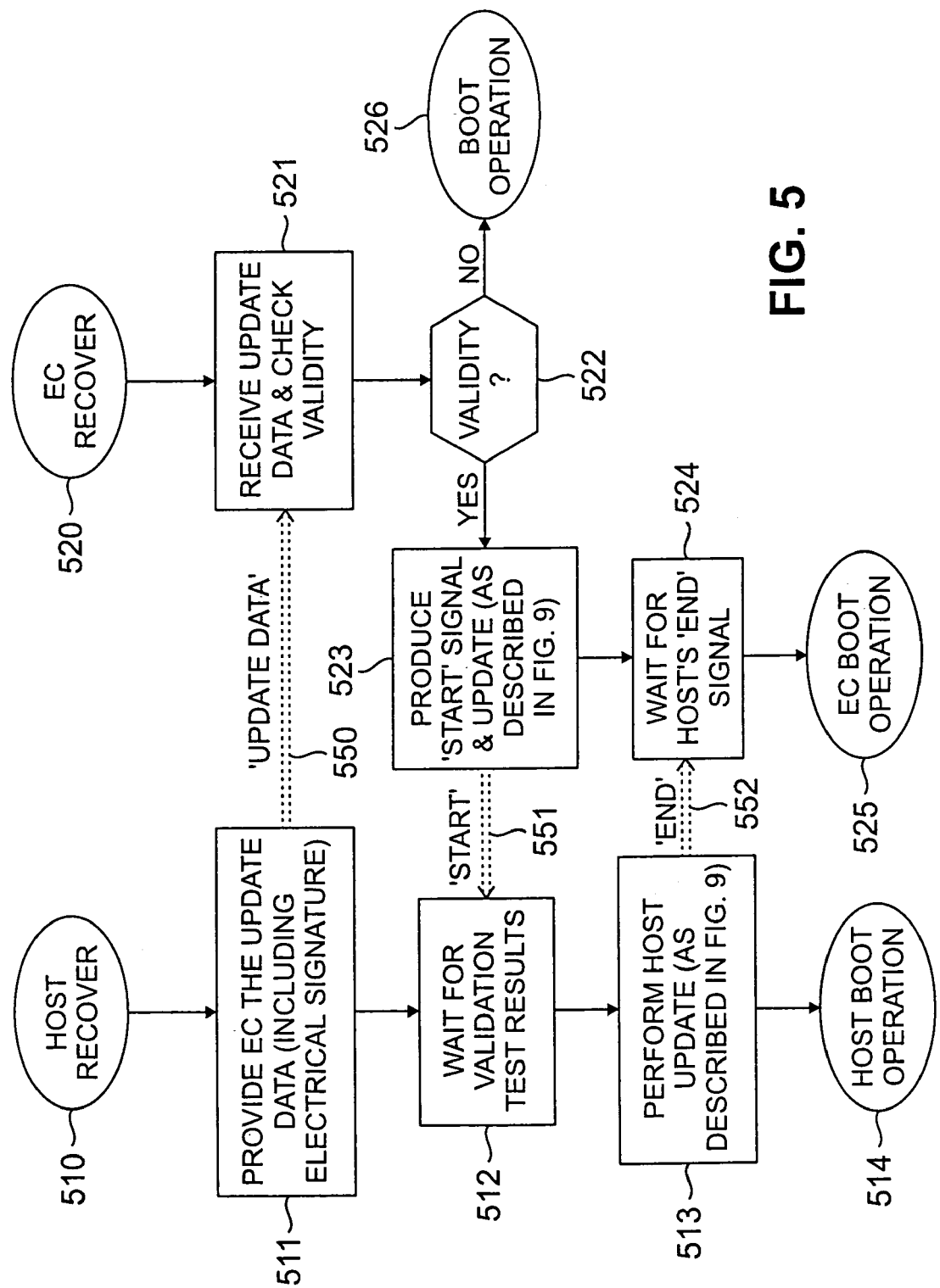
FIG. 5 illustrates the Host and the embedded controller secured recovery process in the form of a flow chart.

FIG. 5 schematically illustrates the Host and EC recovery process. The recovery process is performed after a failure of a BIOS update attempt, and its main goal is to enable restoration of the system default settings as they were prior to the update attempt, or load a valid update version.

Host recovery starts at step 510 where the control passes to step 511 in which Host 101 provides EC 100 with the recovery update data on line 550, that identifies the validity of the update package. When the recovery update data transmission is concluded, the Host processor enters a "wait" loop in step 512, in which it waits for a "Start" signal on line 551 to begin the update operations. The EC update, which is initiated at step 520, begins with testing the validity of the received update recovery code on line 550 in step 521. If the recovery update data is found to be invalid in step 522, Boot operation of EC 100 and Host 101 is performed in step 526. If the recovery update data is found to be valid, the control passes to step 523, in which the flash update procedure is performed as described in FIG. 9. As part of it, EC 100 enables the FM BIOS Host write permission and a "Start" signal on line 551 is produced to instruct Host 101 to start its update operations in step 513. When the update is completed, control is passed to step 524, in which EC 100 enters a "wait" state until the Host update operations are concluded with the "End" signal on line 552. Then a Boot operation of both EC 100 and Host 101 is performed in step 525 and step 514, respectively.

The validity test is a powerful mean of ensuring that the designated code is original, and that it is received correctly with no alterations. The validity test is based on a "summary" of the code generated by a hashing algorithm and an electronic signature generated by a public-key cryptography method. The electronic signature of the designated code is utilized to guarantee the integrity of the code, as guaranteed by the vendor who created the code and signed it. As understood by those skilled in the art, one way of handling these are two unique keys, a private key and a public key, utilized for encryption and decryption of the code's electronic signature.

Full comprehension of the key cryptography and the hash functioning is not germane to an understanding of this invention. However, as will be appreciated by those skilled in the art, even the change of a single bit state in the designated update data will be reflected by the hash function product, so that a different "fingerprint" will be produced and the validation test will result in fingerprints that do not match.

Updates to FM read protected sections may be required as well from time to time, for example, to update a cryptography key. In such cases, it is required to enable Host write access to a restricted area of the FM read protected section. In such cases, Host 101 will be granted the write access only after an identification procedure, but will not be granted read access. This will allow updating specific sections and utilizing an automatic write validation check that the write is successful, but not reading other information that may be in that same section. Another option is to provide to EC 100 the data required for an update, and allow EC 100 to perform the write securely. Alternatively, read operations may be performed by a procedure in which the Host issues an information request for the required information, and access permission is attached to the information request. Then EC 100 will provide the required information, thereby ensuring a secured FM content reads.

The above examples and descriptions have been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. A method for protecting contents of a shared memory in a memory device controlled by an embedded controller by allowing dynamic setting of access permissions to said contents and by allowing updating and recovery of said contents, said method comprising the steps of:
  providing a computerized system comprising at least one Host linked to said memory device;
  providing access paths to said shared memory, to said Host, and to said embedded controller;
  providing an arbitration device for allocating the access paths to said memory device;
  partitioning said memory device into separate blocks, which are designated for storing different types of data;
  designating a location in said memory device for storing protection information that includes data related to access operations allowed by at least one access path to a part of said shared memory; and
  permitting access, via said arbitration device, to said separate blocks of said shared memory by using an access control unit that enables/disables access to predetermined portions of said shared memory by at least one of said access paths.

2. The method as claimed in claim 1, further comprising the step of providing access paths to at least one external monitoring/configuration device.

3. The method as claimed in claim 2 wherein the external monitoring/configuration device comprises one of: a software development device and a programming device of the shared memory, wherein said external monitoring/configuration device is permitted access to parts of said shared memory depending on said protection information.

4. The method as claimed in claim 2 wherein the external monitoring/configuration device comprises one of: a production testing device and a programming device of the shared memory, wherein said external monitoring/configuration service is permitted access to parts of said shared memory depending on said protection information.

5. The method as claimed in claim 1, further comprising the step of utilizing said protection information, by the arbitration device, to permit access to at least one portion of said memory device.

6. The method as claimed in claim 1, wherein the step of partitioning said memory device comprises the following steps:
 allocating a first block for storing information and code required for operation of one of: said Host and said embedded controller;
 partitioning said first block into a set of sections by performing the following steps:
  (a) designating a section for storing said Host's boot code;
  (b) designating a section for storing said embedded controller's boot code; and
  (c) designating remaining sections for storing remaining information and code required for the operation of one of: said Host and said embedded controller;
 allocating a second block for storing the protection information and remaining information and code required for the operation of said embedded controller; and
 partitioning said second block into a set of sections by performing the following steps:
  (a) designating a section for storing the protection information; and
  (b) designating a section of one or more remaining sections for storing the remaining information and code required for the operation of said embedded controller.

7. The method as claimed in claim 6, wherein the step of partitioning said second block further comprises the step of designating a section for storing factory parameters in said second block.

8. The method as claimed in claim 7, further comprising the step of setting access permission for said embedded controller access path to the section designated for storing the factory parameters in said second block, to permit only read operations.

9. The method as claimed in claim 7, further comprising the step of setting access permission for an external monitoring/configuration device access path to said shared memory, to permit read, write and erase operations for each of said sections, except for the section designated for storing said factory parameters, to which said access permission is restricted only to read operations, thereby permitting operations according to information stored in said protection information section.

10. The method as claimed in claim 7, further comprising the step of setting access permission for an access path assigned to an external monitoring/configuration device, and setting access permission for an access path assigned to said shared memory, to permit read, write and erase operations of each of said sections, thereby permitting operations according to information stored in said protection information section.

11. The method as claimed in claim 6, further comprising the steps of:
 setting access permissions for a Host access path by performing the following steps:
  (a) setting Host access to said Host boot section in said first block to permit only read operations;
  (b) preventing Host access to said embedded controller boot section in said first block and to said second block, thereby prohibiting any operation; and
  (c) setting Host access to other sections of said first block to permit read, write and erase operations; and
 setting access permissions for an embedded controller access path by performing the following steps:
  (a) setting access permission for said embedded controller access path to said embedded controller boot section in said first block, and to the section containing protection information in said second block, to permit only read operations; and
  (b) setting access permission for said embedded controller access path to said Host boot section and to the remaining sections in said first block and to the remaining sections in said second block, to permit read, write and erase operations.

12. The method as claimed in claim 11, further comprising the step of setting access permission for said embedded controller access path to a section designated for storing factory parameters in said second block, to permit only read operations.

13. The method as claimed in claim 11, further comprising the step of setting access permission for an external monitoring/configuration device access path to said shared memory, to permit read, write and erase operations for each of said sections, except for a section designated for storing factory parameters, to which said access permission is restricted only to read operations, thereby permitting operations according to information stored in said protection information section.

14. The method as claimed in claim 11, further comprising the step of setting access permission for an access path assigned to an external monitoring/configuration device, and setting access permission for an access path assigned to said shared memory, to permit read, write and erase operations of each of said sections, thereby permitting operations according to information stored in said protection information section.

15. The method as claimed in claim 6, further comprising the step of setting access permission for an external monitoring/configuration device access path to said shared memory, to permit read, write and erase operations for each of said sections, except for a section designated for storing factory parameters, to which said access permission is restricted only to read operations, thereby permitting operations according to information stored in said protection information section.

16. The method as claimed in claim 6, further comprising the step of setting access permission for an access path assigned to an external monitoring/configuration device, and setting access permission for an access path assigned to said shared memory, to permit read, write and erase operations of each of said sections, thereby permitting operations according to information stored in said protection information section.

17. The method as claimed in claim 6, wherein said access control unit comprises sets of flags for enabling/disabling Host read and write/erase access to portions of said first block of said shared memory, which are set by said embedded controller and override any other access rights granted to said Host.

18. The method as claimed in claim 17, wherein said access control unit further comprises sets of flags for enabling/disabling Host read and write/erase access to portions of said first block of said shared memory, which are set by said Host.

19. The method as claimed in claim 18, wherein said access control unit further comprises sets of flags for enabling/disabling embedded controller write/erase access to portions of said first block of said shared memory, which are set by said embedded controller.

20. A method for performing a boot operation in a Host and in an embedded controller of a computerized system employing a shared memory, said method comprising the steps of:
 providing access paths to said shared memory, to said Host, and to said embedded controller;
 providing an arbitration device for allocating the access paths to said shared memory;
 partitioning said shared memory into separate blocks, which are designated for storing different types of data;
 permitting access, via said arbitration device, to said separate blocks of said shared memory by using an access control unit that enables/disables access to predetermined portions of said shared memory by at least one of said access paths;
 resetting an operation of said embedded controller by performing the following steps:
  (a) whenever a "flash touched/untouched" flag is set, performing a validity test to determine validity of said blocks of said shared memory;
  (b) whenever said blocks of said shared memory are valid, performing the following steps:
   (1) setting said "flash touched/untouched" flag to an untouched state;
   (2) enabling said Host's read access from at least one Host section in the shared memory;
   (3) issuing a "no problem" indication to said Host; and
   (4) changing a mode of operation of said embedded controller into a normal operation mode;
  (c) whenever said blocks of said shared memory are invalid, performing the following steps:
   (1) issuing a "problem" indication to said Host; and
   (2) starting a recovery procedure; and
  (d) whenever said "flash touched/untouched" flag is not set, performing steps (b) (2) through (b)(4) above; and
 resetting an operation of said Host by performing the following steps:
  (a) performing basic initializations of said Host;
  (b) waiting for an indication from said embedded controller indicating if said blocks of said shared memory are valid or invalid;
  (c) if the "problem" indication is issued by said embedded controller, performing a recovery procedure and resetting operations of said Host and said embedded controller; and
  (d) if the "no problem" indication is issued by said embedded controller, continuing a boot process for said Host.

21. The method as claimed in claim 20, further comprising the steps of performing a flash update procedure by:
 (1) allowing said Host to carry out update operations by:
  (a) providing said embedded controller update data accompanied by a digital signature, and waiting for said embedded controller to issue an indication whether said update data is valid;
  (b) if an invalid indication is issued, terminating said update procedure; and
  (c) if a valid indication is issued, setting said "flash touched/untouched" flag to a touched state; then enabling Host write operation; then writing said update data to said blocks of said shared memory; upon completion of said write operation, issuing an "End" indication and waiting for said embedded controller to acknowledge said "End" indication; and allowing said Host to perform a Host re-boot process after receiving an acknowledgment indicating completion of said update process by said embedded controller; and
 (2) allowing said embedded controller to carry out update operations by:
  (a) receiving update data accompanied by a digital signature from said Host; performing a validation test on said update data; and whenever said update data is invalid, issuing an "Error" indication and terminating said update procedure;
  (b) whenever said update data is valid, enabling an update of said blocks of said shared memory to be performed by said Host by performing the following steps:
   (i) setting said "flash touched/untouched" flag to the touched state;
   (ii) changing the mode of operation of said embedded controller into a "no memory access" mode;
   (iii) enabling access of said Host to said memory device;
   (iv) indicating to said Host that the update may start;
   (v) waiting for the "End" indication to be issued by said Host;
   (vi) in response to receiving said "End" indication, preventing further access by said Host to said shared memory; and
   (vii) allowing the Host re-boot process by sending the acknowledgment.

22. The method as claimed in claim 21, further comprising the steps of:
 (1) allowing said embedded controller to search for an access violation and any other illegal access attempts during the update of at least one memory block;
 (2) setting said embedded controller "End" indication to a "Successful" status if no violation is found; and
 (3) setting said embedded controller "End" indication to an "Error" status if a violation is found.

23. The method as claimed in claim 20, further comprising the following steps of performing a recovery procedure:
 (1) allowing said Host to carry out a recovery operation by:
  (a) providing said embedded controller with update data to be utilized to recover said blocks of said shared memory;
  (b) waiting for a "Start" indication to be issued by said embedded controller;
  (c) performing an update procedure to update said blocks of said shared memory, and when concluding said update procedure, issuing to said embedded controller an "End" indication; and
  (d) performing Host reset; and (2) allowing said embedded controller to carry out a recovery operation by:
  (a) receiving said update data, and performing a validity test to determine whether said update data is valid;
  (b) whenever said update data is invalid, performing an embedded controller reset; and
  (c) whenever said update data is valid, issuing to said Host the "Start" indication; performing an update procedure and waiting for said Host's "End" indication to be issued; and when said "End" indication is issued, performing an embedded controller reset.

24. An apparatus for protecting contents of a shared memory in a memory device controlled by an embedded controller, by allowing dynamic setting of access permissions to said contents, and by allowing updating and recovery of said contents, said apparatus comprising:
  a computerized system comprising at least one Host linked to said memory device;
  access paths to said shared memory, to said at least one Host, and to said embedded controller;
  an arbitration device for allocating the access paths to said memory device and for permitting access to at least one portion of the memory device, the memory device partitioned into separate portions that are designated for storing different types of data, a location in the memory device designated for storing protection information that includes data related to access operations allowed by at least one access path to a part of the shared memory; and
  an access control unit that enables/disables access to predetermined portions of said shared memory.

25. The apparatus as claimed in claim 24, wherein said memory device comprises:
  a first block for storing information and code required for an operation of one of: said Host and said embedded controller, said first block comprising:
    a section for storing said Host's boot code;
    a section for storing said embedded controller's boot code; and
    remaining sections for storing remaining information and code required for the operation of one of: said Host and said embedded controller; and
  a second block for storing the protection information related to access permissions to said memory device and remaining information and code required for the operation of said embedded controller, said second block comprising:
    a section for storing the protection information; and
    a section of one or more remaining sections for storing the remaining information and code required for the operation of said embedded controller.

26. The apparatus as claimed in claim 25, wherein said second block further comprises a section for storing factory parameters.

27. The apparatus as claimed in claim 26, wherein said access permissions comprise access permission for an embedded controller access path to the section designated for storing the factory parameters in said second block, to permit only read operation.

28. The apparatus as claimed in claim 26, wherein said access permissions comprise access permission for an external monitoring/configuration device access path to said shared memory, to permit read, write and erase operations of each of said sections, except for the section designated for storing said factory parameters, to which said access permission is restricted only to read operations, thereby permitting operations according to information stored in said protection information section.

29. The apparatus as claimed in claim 26, wherein said access permissions comprise access permission for an access path assigned to an external monitoring/configuration device, and an access path assigned to said shared memory, to permit read, write and erase operations of each of said sections, thereby permitting operations according to information stored in said protection information section.

30. The apparatus as claimed in claim 25, wherein said access permissions comprise access permissions for a Host access path, comprising:
  "read only" for Host access to said Host boot section in said first block;
  "no access" for said Host to said embedded controller boot section in said first block and to said second block, such that any operation in said sections is prohibited to said Host;
  "read, write and erase" for Host access to other sections of said first block to permit operations; and
  wherein said access permissions further comprise access permissions for said embedded controller comprising:
    "read only" access permission for an embedded controller access path to said embedded controller boot section in said first block, and to said section containing the protection information in said second block; and
    "read, write and erase" permission for the embedded controller access path to said Host boot section and to the remaining sections in said first block, and to the remaining sections in said second block.

31. The apparatus as claimed in claim 30, wherein said access permissions further comprise access permission for said embedded controller access path to a section designated for storing factory parameters in said second block, to permit only read operation.

32. The apparatus as claimed in claim 30, wherein said access permissions comprise access permission for an external monitoring/configuration device access path to said shared memory, to permit read, write and erase operations of each of said sections, except for a section designated for storing factory parameters, to which said access permission is restricted only to read operations, thereby permitting operations according to information stored in said protection information section.

33. The apparatus as claimed in claim 30, wherein said access permissions comprise access permission for an access path assigned to an external monitoring/configuration device, and an access path assigned to said shared memory, to permit read, write and erase operations of each of said sections, thereby permitting operations according to information stored in said protection information section.

34. The apparatus as claimed in claim 25, wherein said access control unit comprises sets of flags for enabling/disabling Host read and write/erase access to portions of said first block of said shared memory, which are set by said embedded controller and override any other access rights granted to said Host.

35. The apparatus as claimed in claim 34, wherein said access control unit further comprises sets of flags for enabling/disabling Host read and write/erase access to portions of said first block of said shared memory, which are set by said Host.

36. The apparatus as claimed in claim 35, wherein said access control unit further comprises sets of flags for enabling/disabling embedded controller write/erase access to portions of said first block of said shared memory, which are set by said embedded controller.

37. The apparatus as claimed in claim 25, wherein said access permissions to said contents of said shared memory are enabled/disabled according to data stored in said protection information block.

38. The apparatus as claimed in claim 24, further comprising an access path to at least one external monitoring/configuration device.

39. The apparatus as claimed in claim 38 wherein the external monitoring/configuration device comprises one of: a software development device and a programming device of the shared memory, wherein said external monitoring/configuration device is permitted access to parts of said memory depending on said protection information.

40. The apparatus as claimed in claim 9, wherein said access permissions comprise access permission for said external monitoring/configuration device access path to said shared memory, to permit read, write and erase operations of each of said parts of the shared memory, except for a section designated for storing factory parameters, to which said access permission is restricted only to read operations, thereby permitting operations according to information stored in said protection information section.

41. The apparatus as claimed in claim 38 wherein the external monitoring/configuration device comprises one of: a production testing device and a programming device of the shared memory, wherein said external monitoring/configuration device is permitted access to parts of said memory depending on said protection information.

42. The apparatus as claimed in claim 41, wherein said access permissions comprise access permission for the access path assigned to said external monitoring/configuration device, and an access path assigned to said shared memory, to permit read, write and erase operations of each of said parts of the shared memory, thereby permitting operations according to information stored in said protection information section.

43. The apparatus as claimed in claim 24, further comprising Host boot code included in Host code.

44. The apparatus as claimed in claim 24, further comprising embedded controller boot code included in embedded controller code.

45. The apparatus as claimed in claim 27, wherein the arbitration device is further capable of utilizing said protection information to permit access to at least one portion of said memory device.

46. The apparatus as claimed in claim 24, wherein said access permissions to said contents of said shared memory are enabled/disabled according to data stored in a protection information block.

* * * * *